US012351668B2

(12) United States Patent
Klun et al.

(10) Patent No.: US 12,351,668 B2
(45) Date of Patent: Jul. 8, 2025

(54) ORTHODONTIC ARTICLES COMPRISING POLYMERIZED COMPOSITION WITH PENDENT CYCLIC MOIETIES, METHODS, AND POLYMERIZABLE COMPOSITIONS

(71) Applicant: SOLVENTUM INTELLECTUAL PROPERTIES COMPANY, Maplewood, MN (US)

(72) Inventors: Thomas P. Klun, Lakeland, MN (US); Chad M. Amb, Roberts, WI (US); Richard J. Pokorny, Maplewood, MN (US); Saswata Chakraborty, Cottage Grove, MN (US); Benjamin C. Mac Murray, Minneapolis, MN (US); Tianyu Wu, St. Paul, MN (US); Ahmed S. Abuelyaman, Woodbury, MN (US); Yongshang Lu, Woodbury, MN (US); Daniel J. Skamser, Ham Lake, MN (US); Karl J. L. Geisler, St. Paul, MN (US); John M. Riedesel, San Jose, CA (US)

(73) Assignee: Solventum Intellectual Properties Company, Maplewood, MN (US)

( * ) Notice: Subject to any disclaimer, the term of this patent is extended or adjusted under 35 U.S.C. 154(b) by 804 days.

(21) Appl. No.: 17/605,289

(22) PCT Filed: May 19, 2020

(86) PCT No.: PCT/IB2020/054745
§ 371 (c)(1),
(2) Date: Oct. 21, 2021

(87) PCT Pub. No.: WO2020/234775
PCT Pub. Date: Nov. 26, 2020

(65) Prior Publication Data
US 2022/0242991 A1  Aug. 4, 2022

Related U.S. Application Data

(60) Provisional application No. 62/850,721, filed on May 21, 2019.

(51) Int. Cl.
C08F 2/46 (2006.01)
A61C 7/08 (2006.01)
B29C 64/124 (2017.01)
B33Y 10/00 (2015.01)
B33Y 70/00 (2020.01)
B33Y 80/00 (2015.01)
C08F 2/50 (2006.01)
C08F 290/06 (2006.01)
C08G 61/04 (2006.01)

(Continued)

(52) U.S. Cl.
CPC ............ *C08F 290/067* (2013.01); *A61C 7/08* (2013.01); *B29C 64/124* (2017.08); *B33Y 10/00* (2014.12); *B33Y 70/00* (2014.12); *B33Y 80/00* (2014.12); *B29K 2105/0002* (2013.01); *B29L 2031/753* (2013.01)

(58) Field of Classification Search
CPC ............ C08G 18/8038; C08G 18/8175; C08G 18/4854; C08G 18/755; C08G 18/3215; C08G 18/3243; C08G 18/673; C08G 18/8016; C08G 18/44; C08G 18/4238; C08G 18/672; C08G 18/8116; C08G 18/42; A61C 7/08; A61C 7/0002; B29C 64/124; B29L 2031/753; B33Y 80/00; B33Y 10/00; B33Y 70/00; B29K 2105/0002
USPC ...................................... 522/96, 90, 1; 520/1
See application file for complete search history.

(56) References Cited

U.S. PATENT DOCUMENTS

| | | | |
|---|---|---|---|
| 3,429,722 A | 2/1969 | Economy | |
| 3,795,524 A | 3/1974 | Sowman | |

(Continued)

FOREIGN PATENT DOCUMENTS

| | | |
|---|---|---|
| CA | 3008362 | 6/2017 |
| CN | 106029046 A | 10/2016 |

(Continued)

OTHER PUBLICATIONS

Ali, "Relationship Between Physical-Mechanical Properties and Glass Transition Temperatures of UV-Cured Polymers", Polymer-Plastics Technology and Engineering, May 1998, vol. 37, No. 2, pp. 175-189, XP055553669.

(Continued)

*Primary Examiner* — Jessica Whiteley

(57) ABSTRACT

Polymerizable compositions suitable for use for 3D printed (e.g. orthodontic) articles, especially orthodontic alignment trays, are described. The polymerizable composition comprises a) 30-70 parts by weight of (meth)acrylate monomer(s); and b) urethane (meth)acrylate polymer; wherein the reaction product comprises at least 1 wt. % polymerized units of a multifunctional compound comprising pendent cyclic moieties. The orthodontic article comprises the reaction product of a polymerizable composition as described herein. The urethane (meth)acrylate polymer typically comprises polymerized units of a multifunctional compound comprising pendent cyclic moieties and/or at least one (meth)acrylate monomer comprises polymerized units of a multifunctional compound comprising pendent cyclic moieties. Also described are methods of making an article, non-transitory machine-readable medium comprising data representing a three-dimensional model of an article, and systems.

19 Claims, 7 Drawing Sheets

(51) Int. Cl.
*B29K 105/00* (2006.01)
*B29L 31/00* (2006.01)

(56) References Cited

U.S. PATENT DOCUMENTS

| | | | |
|---|---|---|---|
| 4,047,965 | A | 9/1977 | Karst |
| 4,591,626 | A | 5/1986 | Kawai |
| 4,954,462 | A | 9/1990 | Wood |
| 5,109,097 | A * | 4/1992 | Klun ............... C08G 18/675 528/110 |
| 5,130,347 | A | 7/1992 | Mitra |
| 5,185,299 | A | 2/1993 | Wood |
| 5,780,154 | A | 7/1998 | Okano |
| 5,981,621 | A | 11/1999 | Clark |
| 6,183,593 | B1 | 2/2001 | Narang |
| 6,200,732 | B1 | 3/2001 | Tamura |
| 7,622,535 | B2 | 11/2009 | Dairoku |
| 8,853,338 | B2 | 10/2014 | Wang |
| 9,012,531 | B2 | 4/2015 | Abuelyaman |
| 9,205,601 | B2 | 12/2015 | DeSimone |
| 9,295,617 | B2 | 3/2016 | Eckert |
| 9,360,757 | B2 | 6/2016 | DeSimone |
| 9,463,144 | B2 | 10/2016 | Shukla |
| 2005/0090575 | A1 | 4/2005 | Chaput |
| 2007/0031791 | A1 | 2/2007 | Cinader, Jr. |
| 2008/0248442 | A1 | 10/2008 | Raby |
| 2009/0054543 | A1 * | 2/2009 | Nozawa ............... G03F 7/027 560/104 |
| 2011/0091832 | A1 | 4/2011 | Kim |
| 2011/0183298 | A1 | 7/2011 | Sun |
| 2013/0095446 | A1 | 4/2013 | Andreiko |
| 2013/0130203 | A1 | 5/2013 | Velamakanni |
| 2014/0356799 | A1 | 12/2014 | Cinader, Jr. |
| 2015/0044623 | A1 | 2/2015 | Rundlett |
| 2016/0081887 | A1 * | 3/2016 | Abuelyaman ........ A61C 19/003 523/115 |
| 2016/0288479 | A1 | 10/2016 | Shuey |
| 2017/0007362 | A1 | 1/2017 | Chen |
| 2017/0151718 | A1 | 6/2017 | Rolland |
| 2019/0083208 | A1 | 3/2019 | Hansen |

FOREIGN PATENT DOCUMENTS

| | | |
|---|---|---|
| JP | 2002161124 | 6/2002 |
| WO | WO 1996-15179 | 5/1996 |
| WO | WO 2009-045752 | 4/2009 |
| WO | 2012/003136 A1 | 1/2012 |
| WO | WO 2015-094842 | 6/2015 |
| WO | WO 2015-126666 | 8/2015 |
| WO | WO-2015126666 A1 * | 8/2015 ......... A61C 13/0022 |
| WO | WO 2016-094272 | 6/2016 |
| WO | WO 2016-109660 | 7/2016 |
| WO | WO 2016-148960 | 9/2016 |
| WO | WO 2016-149007 | 9/2016 |
| WO | WO 2018-005501 | 1/2018 |
| WO | WO 2018-106531 | 6/2018 |
| WO | WO 2018-119026 | 6/2018 |
| WO | WO 2019-023009 | 1/2019 |
| WO | WO 2019-023120 | 1/2019 |
| WO | WO 2019-023166 | 1/2019 |
| WO | WO 2019-048963 | 3/2019 |
| WO | WO 2019-103855 | 5/2019 |
| WO | WO 2019-104072 | 5/2019 |
| WO | WO 2019-104079 | 5/2019 |
| WO | WO 2019-175716 | 9/2019 |
| WO | WO 2019-224699 | 11/2019 |
| WO | WO 2019-244007 | 12/2019 |
| WO | 2020/003197 A2 | 1/2020 |
| WO | WO 2020-003169 | 1/2020 |
| WO | WO 2020-005411 | 1/2020 |
| WO | WO 2020-005413 | 1/2020 |
| WO | WO 2020-104873 | 5/2020 |

OTHER PUBLICATIONS

Bishop, "Multiple Photoinitiators for Improved Performance", Proceedings of the Radtech NA Conference Proceedings, Jan. 1, 2008, 8 pages, XP055558707.

Chun, "Preparation and Characterization of UV Cured Optical Films Containing a Fluorene Compound", Molecular Crystals and Liquid Crystals, 2015, vol. 622, No. 1, pp. 6-13.

Elles, "De Quelques Polyacrylamides", 1959, Chimie Moderne, vol. 4, No. 26, pp. 53-57.

Fang, "The influence of monobutyl itaconate and β-carboxyethyl acrylate on acrylic latex pressure sensitive adhesives", International Journal of Adhesion and Adhesives, May 2018, vol. 84, pp. 387-393.

Fleischhaker, "Glass-Transition-, Melting-, and Decomposition Temperatures of Tailored Polyacrylates and Polymethacrylates: General Trends and Structure-Property Relationships", Macromolecular Chemistry and Physics, 2014, vol. 215, pp. 1192-1200.

Hopfinger, "Molecular Modeling of Polymers. IV. Estimation of Glass Transition Temperatures", Journal of Polymer Science: Part B: Polymer Physics, 1988, vol. 26, pp. 2007-2028.

Jakubowski, "Comparison of thermomechanical properties of statistical, gradient and block copolymers of isobornyl acrylate and n-butyl acrylate with various acrylate homopolymers", Polymer, 2008, vol. 49, pp. 1567-1578.

Matsumoto, "Radical Polymerization of 4-tert-Butylcyclohexyl Methacrylate: Polymerization Kinetics and Polymer Properties", Macromolecules 1993, vol. 26, No. 7, pp. 1659-1685.

Matsumoto, "Synthesis and Characterization of Poly(I-adamantyl methacrylate): Effects of the Adamantyl Group on Radical Polymerization Kinetics and Thermal Properties of the Polymer", Macromolecules 1991, vol. 24, No. 14, pp. 4017-4024.

Matsumoto, "Synthesis and Thermal Properties of Poly(cycloalkyl methacrylate)s Bearing Bridged- and Fused-Ring Structures", Journal of Polymer Science: Part A: Polymer Chemistry, 1993, vol. 31, pp. 2531-2539.

Methacrylate Resins, E.I. du Pont de Nemours & Co., Industrial and Engineering Chemistry, Oct. 1936, vol. 28, No. 10, pp. 1160-1163.

Russell, "Thermal and Dynamic Mechanical Relaxation Behavior of Stereoregular Poly(2-Hydroxyethyl Methacrylate)", Journal of Polymer Science: Polymer Physics, 1980, vol. 18, pp. 1271-1283.

Song, "In Vitro Evaluation of Chemically Cross-Linked Shape-Memory Acrylate-Methacrylate Copolymer Networks as Ocular Implants", Journal of Physical Chemistry B, 2010, vol. 114, No. 21, pp. 7172-7178.

Turner, "The glass transition temperature of poly(N-vinyl pyrolidone) by differential scanning calorimetry", Polymer, May 1985, vol. 26, pp. 757-762.

Wilson, "Thermal Expansion of Amorphous Polymers at Atmospheric Pressure. I. Experimental", Macromolecules, 1973, vol. 6, No. 6, pp. 902-908.

International Search Report for PCT International Application No. PCT/IB2020/054745, mailed on Aug. 27, 2020, 5 pages.

* cited by examiner

ORTHODONTIC ARTICLES COMPRISING POLYMERIZED COMPOSITION WITH PENDENT CYCLIC MOIETIES, METHODS, AND POLYMERIZABLE COMPOSITIONS

BACKGROUND 3D printing can be used to fabricate orthodontic clear tray aligners. Orthodontic clear tray aligners are provided in a series and are intended to be worn in succession, over a period of months, to gradually move teeth in incremental steps towards a desired target arrangement. Some types of clear tray aligners have a row of tooth-shaped receptacles for receiving each tooth of the patient's dental arch, and the receptacles are oriented in slightly different positions from one appliance to the next to incrementally urge each tooth toward its desired target position by virtue of the resilient properties of the polymeric material.

SUMMARY

Existing 3D printable/polymerizable resins tend to be too brittle (e.g., fail to yield and exhibit low elongation) for a resilient oral appliance such as an aligner. Even cured compositions that are not brittle when dry may lose their strength after being exposed to an (e.g. aqueous) oral environment. On the other hand, an aligner or other appliance prepared from such resins could be too soft and flexible, and not exert the force needed to move teeth. Thus, there is a need for curable liquid resin compositions that are tailored and well suited for creation of resilient articles using 3D printing (e.g., additive manufacturing) method. Preferably, curable liquid resin compositions to be used in the vat polymerization 3D printing process have low viscosity, a proper curing rate, and excellent mechanical properties in the final cured article. In contrast, compositions for inkjet printing processes need to be much lower viscosity to be able to be jetted through nozzles, which is not the case for most vat polymerization resins.

Presently described are polymerizable compositions suitable for use for 3D printed (e.g. orthodontic) articles, especially orthodontic alignment trays.

The polymerizable composition comprises
a) 30-70 parts by weight of (meth)acrylate monomer(s); and
b) urethane (meth)acrylate polymer;
wherein the reaction product comprises at least 1 wt. % polymerized units of a multifunctional compound comprising pendent cyclic moieties.

The orthodontic article comprises the reaction product of a polymerizable composition as described herein.

In typical embodiments, the urethane (meth)acrylate polymer comprises polymerized units of a multifunctional compound comprising pendent cyclic moieties and/or at least one (meth)acrylate monomer comprises polymerized units of a multifunctional compound comprising pendent cyclic moieties.

In some embodiments, the inclusion of the pendent cyclic moieties can increase the tensile strength at yield by at least 25, 50 and even 75% relative to the same composition lacking pendent cyclic moieties. In some embodiments, the inclusion of the pendent cyclic moieties can increase the initial relaxation modulus by at least 25, 50 and even 75% relative to the same composition lacking pendent cyclic moieties. In some embodiments, the inclusion of the pendent cyclic moieties can reduce the loss of relaxation modulus after 30 minutes by at least 10%.

In another embodiment, a method of making an article is described comprising: a) providing a photopolymerizable composition, as described herein; b) selectively curing the photopolymerizable composition to form the article; and c) repeating steps a) and b) to form multiple layers and create the article comprising a three-dimensional structure.

In another embodiment, a non-transitory machine-readable medium comprising data representing a three-dimensional model of an article, when accessed by one or more processors interfacing with a 3D printer, causes the 3D printer to create an article comprising a reaction product of a photopolymerizable composition, as described herein.

In another embodiment, a method is described comprising: a) receiving, by a manufacturing device having one or more processors, a digital object comprising data specifying a plurality of layers of an article; and b) generating, with the manufacturing device by an additive manufacturing process, the article based on the digital object, the article comprising a reaction product of a photopolymerizable composition, as described herein.

A system comprising: a) a display that displays a 3D model of an article; and b) one or more processors that, in response to the 3D model selected by a user, cause a 3D printer to create a physical object of an article, the article comprising a reaction product of a photopolymerizable composition, as described herein.

DETAILED DESCRIPTION OF ILLUSTRATIVE EMBODIMENTS

Figure 1:
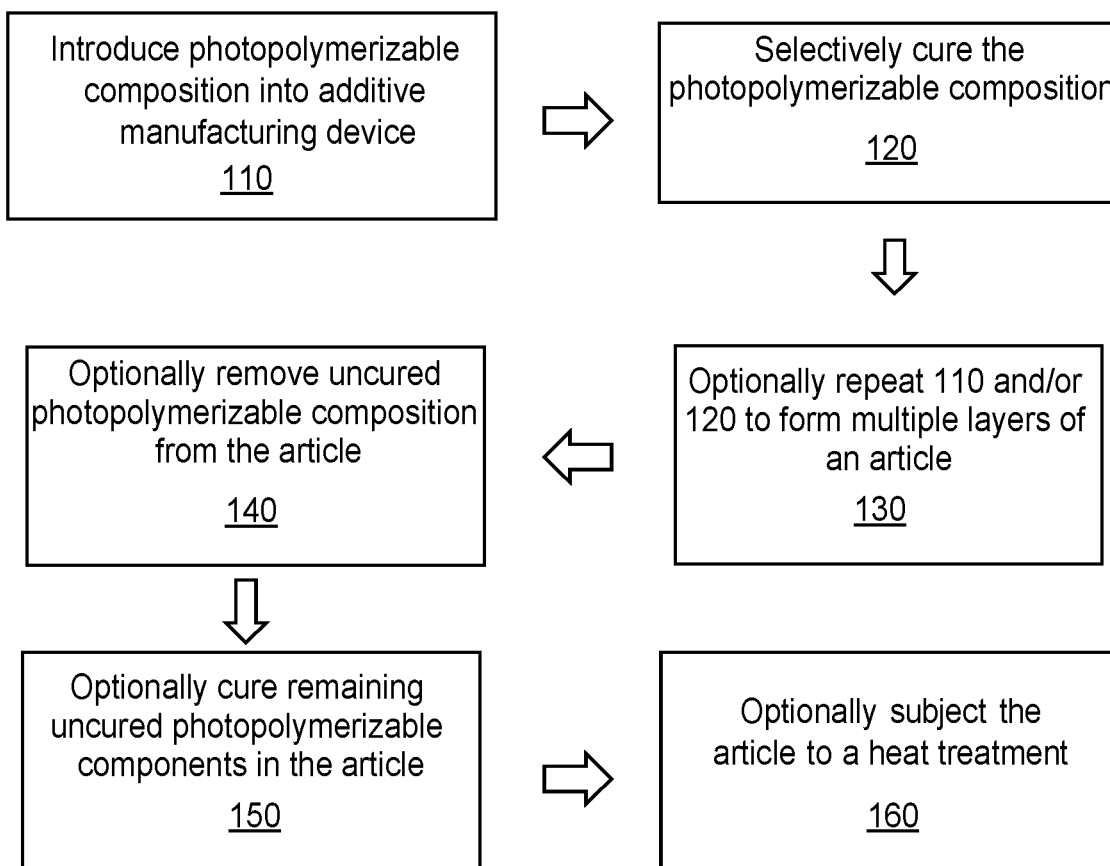
FIG. 1 is a flowchart of a process for building an article using the photopolymerizable compositions disclosed herein.

Presently described are polymerizable compositions and orthodontic articles comprising the reaction product of a polymerizable composition. The polymerizable composition comprises one or more (meth)acrylate monomers and one or more urethane (meth)acrylate polymers. The reaction product comprises polymerized units of a multifunctional (e.g. difunctional) compound comprising pendent cyclic moieties.

In some embodiment, the polymerizable composition comprises at least one urethane (meth)acrylate polymer comprising pendent cyclic moieties. In other embodiments, the polymerizable composition comprises at least one (meth) acrylate monomer comprising pendent cyclic moieties. In yet another embodiment, the polymerizable composition may comprise a urethane (meth)acrylate polymer comprising pendent cyclic moieties in combination with a (meth) acrylate monomer comprising pendent cyclic moieties.

The polymerizable composition and reaction product thereof comprises at least 1, 1.5, 2, 2.5, 3, 3.5, 4, 4.5, or 5 wt. % polymerized units of a multifunctional compound comprising pendent cyclic moieties, based on the total amount of polymerized organic components. In typical embodiments, the amount of polymerized units of a multifunctional compound comprising pendent cyclic moieties is no greater than 25, 24, 23, 22, 21, or 20 wt. %. In some embodiments, the amount of polymerized units of a multifunctional compound comprising pendent cyclic moieties is no greater than 19, 18, 17, 16, 15, 15, 13, 12, 11, 10, 9, 8, 7, 6, or 5 wt. %.

Polyurethane (meth)acrylates are prepared by reaction of one or more polyols (e.g. diols), with one of more polyisocyanates (e.g. diisocyanates), followed by end-capping with a hydroxy functional or isocyanate functional (meth)acrylate. Likewise, polyureas can be prepared with the same reaction scheme utilizing polyamine (e.g. diamines) in place of polyols, or in combination with polyols.

In some embodiments, the pendent cyclic moieties can be derived from an isocyanate reactive compound, such as a diol, dithiols, or diamine with pendent cyclic moieties. In other embodiments, the pendent cyclic moieties can be derived from a hydroxyl reactive compound, such as an isocyanate with pendent cyclic moieties. The pendent cyclic group(s) may be cycloaliphatic, aromatic (e.g. arylene), or a combination thereof. Cycloaliphatic groups typically comprise at least 3, 4, 5, or 6, carbon atoms. In some embodiments, the aromatic groups may be characterized as fluorene, biphenyl, triphenyl, as well as cyclic substituted bisphenol. In some embodiments, the pendent cyclic group comprises multiple (e.g. 2 or 3) fused rings. Some of such compounds are known from the literature such as described in U.S. Pat. No. 5,109,097; incorporated herein by reference.

In some embodiments, the compound with the pendent cyclic group may be characterized as a fluorene compound.

Some representative compounds include:

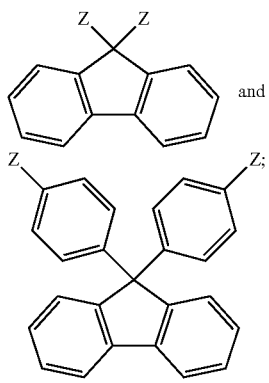

wherein Z is independently LOH, LSH, LNHR², LNCO, wherein L is a covalent bond or divalent linking group and R² is hydrogen or C1-C4 alkyl group. In some embodiments, L is alkylene or oxyalkylene having 2-12 carbon atoms and in some embodiments, no greater than 4, 3, or 2 carbon atoms.

As evident from the above structures, the fluorene moiety is pendent relative to the backbone. The backbone is defined by the shortest chain between the reactive groups, represented by Z. In this embodiment, the backbone and pendent cyclic group includes a quaternary carbon atom. In some embodiments, the pendent cyclic moiety may be characterized as a cardo moiety.

In other embodiments, the pendent cyclic moiety may lack a quaternary carbon atom, such as illustrated by the following compounds, wherein Z is the same as previously described.

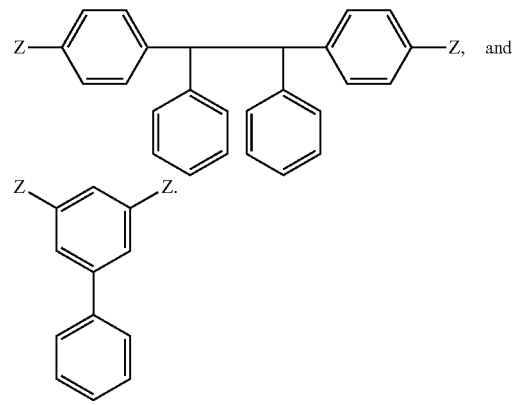

In some embodiments, the compound may have a combination of aromatic and cycloaliphatic groups, such as illustrated by the following compounds, wherein Z is the same as previously described.

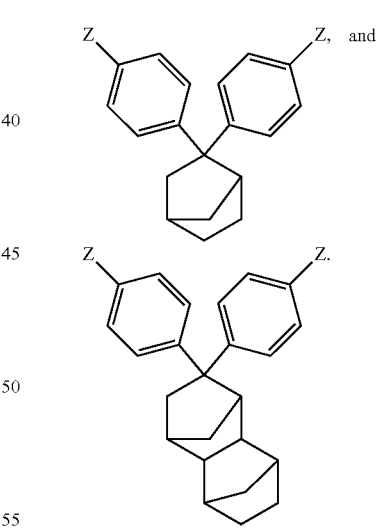

In some embodiments, the urethane (meth)acrylate polymer comprises a reaction product of an isocyanate reactive or hydroxyl reactive (e.g. cardo) compound with pendent cyclic moieties, a diol lacking pendent cyclic moieties, a diisocyanate, and a hydroxy functional (meth)acrylate.

When the compound with pendent cyclic moieties is a diol or diamine, the reaction product can be represented by the following general formula:

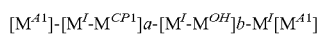

wherein
- $M^{A1}$ are polymerized units derived from a hydroxy mono- or poly-functional (meth)acrylate;
- $M^I$ are polymerized units derived from a diisocyanate;
- $M^{CP1}$ are polymerized units derived from a diol or diamine comprising pendent cyclic moieties;
- $M^{OH}$ are polymerized units derived from a diol lacking pendent cyclic moieties; and
- the polymerized units are bonded via urethane linkages in the case of diols and urea linkages in the case of diamines.

A more detailed formula of a polyurethane (meth)acrylate prepared from a diol or diamine with pendent cyclic moieties is as follows:

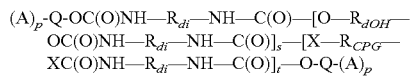

wherein
- A has the formula $—OC(=O)C(R_1)=CH_2$, wherein $R_1$ is H or alkyl of 1 to 4 carbon atoms, p is 1 or 2,
- Q is a polyvalent organic linking group,
- $R_{di}$ is the residue of a diisocyanate,
- $R_{dOH}$ is the residue of a diol lacking (e.g. cardo) pendent cyclic moieties,
- $R_{CPG}$ is the residue of a (e.g. cardo) diol or diamine comprising pendent cyclic groups,
- X is O or $NR_2$ where $R_2$ is H or an alkyl group of 1 to 4 carbon atoms, and
- s and t are independently 1 or greater, and s+t typically averages from 2 to 15.

In some embodiments, A is a methacrylate group. In some embodiments, s+t is no greater than 15, 14, 13, 12, 11, or 10. In some embodiments, s averages at least 2, 3, 4, or 5. In some embodiments, t averages 1 or 2. It is appreciated that s and t units may be connected to each other in any order.

In some embodiments $R_{CPG}$ may be represented as

wherein CPG is a pendent cyclic group and $Q_1$ is a polyvalent connecting group.

Q and is defined below with respect to the hydroxyl functional (meth)acrylate.

When the compound with pendent cyclic moieties is a diisocyanate, the reaction product can be represented by the following general formula:

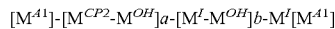

wherein
- $M^{A1}$ are polymerized units derived from a hydroxy mono- or poly-functional (meth)acrylate;
- $M^I$ are polymerized units derived from a diisocyanate;
- $M^{CP2}$ are polymerized units derived from a diisocyanate comprising pendent cyclic moieties;
- $M^{OH}$ are polymerized units derived from a diol lacking pendent cyclic moieties; and
- the polymerized units are bonded via urethane linkages.

In some embodiments, the urethane (meth)acrylate polymer comprises a reaction product of an isocyanate reactive or hydroxyl reactive (e.g. cardo) compound with pendent cyclic moieties, a diol lacking pendent cyclic moieties, a diisocyanate, and an isocyanate functional (meth)acrylate.

When the compound with pendent cyclic moieties is a diol or diamino, the reaction product can be represented by the following general formula:

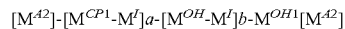

wherein
- $M^{A2}$ are polymerized units derived from an isocyanate functional (meth)acrylate;
- $M^I$ are polymerized units derived from a diisocyanate;
- $M^{CP1}$ are polymerized units derived from a diol or diamine comprising pendent cyclic moieties;
- $M^{OH}$ are polymerized units derived from a diol lacking pendent cyclic moieties; and
- $M^{OH1}$ is a polymerized unit selected from $M^{OH}$ or $M^{CP1}$; and
- the polymerized units are bonded via urethane linkages in the case of diols are urea linkages in the case of diamines.

A more detailed formula of a polyurethane (meth)acrylate prepared from a diol or diamine with pendent cyclic moieties is as follows:

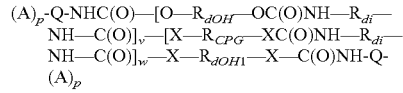

wherein $R_{di}$, Q, A, p, $R_{dOH}$, $R_{CPG}$, and X are defined as above, v+w is 1 to 15, and $R_{dOH1}$ is selected from $R_{dOH}$ or $R_{CPG}$, with the provisos that if $R_{dOH1}$ is $R_{dOH}$ then X can only be O, if v is 0 then $R_{dOH1}$ is $R_{dOH}$, and if w is 0 then $R_{dOH1}$ is $R_{CPG}$.

In some embodiments, A is a methacrylate group. In some embodiments, v+w is no greater than 15, 14, 13, 12, 11, or 10. In some embodiments, v averages at least 2, 3, 4, or 5. In some embodiments, w averages 1 or 2. It is appreciated that v and w units may be connected to each other in any order.

When the compound with pendent cyclic moieties is a diisocyanate, the reaction product can be represented by the following general formula:

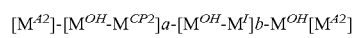

- $M^{A2}$ are polymerized units derived from an isocyanate functional (meth)acrylate;
- $M^I$ are polymerized units derived from a diisocyanate;
- $M^{CP2}$ are polymerized units derived from a diisocyanate comprising a pendent cyclic moiety;
- $M^{OH}$ are polymerized units derived from a diol lacking pendent cyclic moieties; and
- the polymerized units are bonded via urethane linkages in the case of diisocyanate or urea linkages in the case of diamine.

The urethane (meth)acrylate polymers are generally random polymers. Thus, the repeats units are randomly distributed between the (meth)acrylate end groups. Further, it is appreciated that a distribution of reaction products are formed. With respect to the general formula depicted above. At least some of the reaction products include at least one "a" and at least one "b". In some embodiments, the values of a+b can be 15, 14, 13, 12, 11, or 10. In some embodiments, a averages at least 2, 3, 4, or 5. In some embodiments, b averages 1 or 2.

However, reaction products are typically present wherein "a" is zero. For example, when 0.5 equivalence of an amine compound having pendent cyclic groups is coreacted with 2.5 equivalence of at polyol lacking pendent cyclic groups; it is probable for this to occur. Further, it is possible (while not probable) that reaction products may also be present wherein "b" is zero. The reaction product mixture has the molecular weight (Mw and Mn) described below.

A more detailed formula of a polyurethane (meth)acrylate prepared from a diisocyanate with pendent cyclic moieties is as follows:

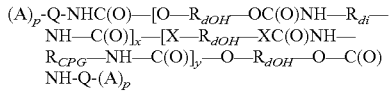

wherein $R_{di}$, Q, A, p, $R_{dOH}$, and X are defined as above, $R_{CPG}$ is the residue of a (e.g. cardo) diisocyanate comprising pendent cyclic groups, and x+y is 2 to 15, and y is at least 1.

In some embodiments, A is a methacrylate group. In some embodiments, x+y is no greater than 15, 14, 13, 12, 11, or 10. In some embodiments, x averages at least 2, 3, 4, or 5. In some embodiments, y averages 1 or 2. It is appreciated that x and y units may be connected to each other in any order. Further, it is appreciated that a distribution of reaction products are formed as described by the general formulas.

In any of the above synthesis, a diol (meth)acrylate may optionally be included, as will subsequently be described. When a diol (meth)acrylate is present, the above general formula further comprises linkages that can be represented as -[$M^{OHA}$-$M^I$]c- wherein $M^{OHA}$ is a polymerized units of a diol (meth)acrylate and $M^I$ is a polymerized units derived from a diisocyanate.

Likewise, the more detailed formula can include linkages represented by —[O—$R_{AD}$—OC(O)NH—$R_{di}$—NH—C(O)]$_c$- wherein $R_{AD}$ is a residue of a diol (meth)acrylate.

In this embodiment, the polyurethane (meth)acrylate includes pendent (meth)acrylate groups in addition to terminal (meth)acrylate groups provided by endcapping.

More detailed formulas (i.e. the following four formulas) of a polyurethane (meth)acrylate polymer that further comprises a reaction product of a diol (meth)acrylate are as follows:

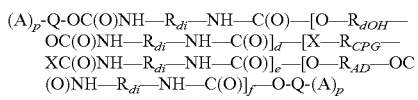

wherein $R_{di}$, Q, A, p, $R_{dOH}$, $R_{CPG}$, $R_{AD}$, and X are defined as above; d, e, and f are at least 1; and d+e+f are 3-15.

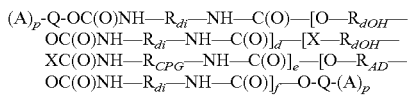

wherein $R_{di}$, Q, A, p, $R_{dOH}$, $R_{CPG}$, $R_{AD}$, and X are defined as above; d, e, and f are at least 1; and d+e+f are 3-15, In some embodiments, A is a methacrylate group. In some embodiments, d+e+f is no greater than 15, 14, 13, 12, 11, or 10. In some embodiments, d averages at least 2, 3, 4, or 5. In some embodiments, e averages 1 or 2, and f averages 1 or 2. It is appreciated that the d, e, and f units may be connected to each other in any order.

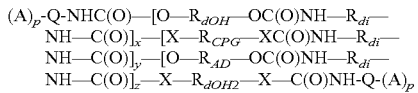

wherein $R_{di}$, Q, A, p, $R_{dOH}$, $R_{CPG}$, $R_{AD}$ and X are defined as above; $R_{dOH2}$ is selected from $R_{dOH}$, $R_{CPG}$, or $R_{AD}$, x+y+z is 2 to 15 with the provisos that if $R_{dOH2}$ is $R_{dOH}$ or $R_{AD}$ then X can only be O, if x is 0 then $R_{dOH2}$ is $R_{dOH}$, if y is 0 then $R_{dOH2}$ is $R_{CPG}$, and if z is 0 then $R_{dOH2}$ is $R_{AD}$.

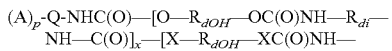

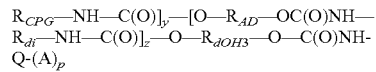

wherein $R_{di}$, Q, A, p, $R_{dOH}$, $R_{CPG}$, and X are defined as above, $R_{AD}$ is the residue of a (meth)acrylated diol, $R_{dOH3}$ is selected from $R_{dOH}$, or $R_{AD}$, x+y+z is 2 to 15, y is at least 1, with the provisos that if x is 0 then $R_{dOH3}$ is $R_{dOH}$, and if z is 0 then $R_{dOH3}$ is $R_{AD}$.

In some embodiments, A is a methacrylate group. In some embodiments, x+y+z is no greater than 15, 14, 13, 12, 11, or 10. In some embodiments, x averages at least 2, 3, 4, or 5. In some embodiments, y averages 1 or 2, and z averages 1 or 2. It is appreciated that the x, y, and z units may be connected to each other in any order.

The diols lacking pendent cyclic moieties can be selected from polycarbonate diols, a polyester diols, polyether diols, or a combination thereof. The diols can be characterized as polymeric diols in view of the diols have repeating (e.g. polycarbonate, polyester, polyether) units. In some embodiments, a combination of diols is used wherein a polycarbonate diol is present in an amount by weight greater than the concentration of other (e.g. polyester, polyether) diols. In some embodiments, a combination of diols is used wherein a polyester diol is present in an amount by weight greater than the concentration of other (e.g. polycarbonate, polyether) diols. In some embodiments, a combination of diols is used wherein a polyether diol is present in an amount by weight greater than the concentration of other (e.g. polycarbonate, polyester) diols.

The polycarbonate diol is typically of the following formula:

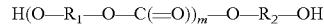

wherein $R_1$ and $R_2$ are independently an aliphatic, cycloaliphatic, or aliphatic/cycloaliphatic alkylene group. In typical embodiments, the average number of carbon atoms of all the $R_1$ and $R_2$ groups ranges from 4 to 10. The subscript "m" is 2 or greater to obtain the molecular weight described below. In some embodiments, the average number of carbon atoms of all the $R_1$ and $R_2$ is at least 5, 6, 7, or 8. In some embodiments, the average number of carbon atoms of all the $R_1$ and $R_2$ is no greater than 9, 8, 7, or 6. In select embodiments, at least one of $R_1$ or $R_2$ is —$CH_2CH_2CH(CH_3)CH_2CH_2$—, —$(CH_2)_6$—, or —$(CH_2)_4$—, and preferably a combination of —$CH_2CH_2CH(CH_3)CH_2CH_2$—, and —$(CH_2)_6$—.

In one embodiment, the urethane (meth)acrylate polymer comprises at least 10, 15, 20, 25, 30, 35, 40, 45, 50, 55, 60, 65, 70, 75, 80, 85, 90% or greater of polycarbonate moieties.

In some embodiments, the polyester diol is of the following formula:

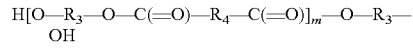

wherein $R_3$ and $R_4$ are independently straight or branched chain or cycle-containing alkylene, groups, that optionally include heteroatoms, such as oxygen. $R_3$ and $R_4$ independently comprise 2 to 40 carbon atoms. The subscript "m" is at least 2, 3, 4, 5, 6, or 7. The subscript "m" is typically no greater than 50, 45, 40, 35, 30, 25, 20, or 15 to obtain the molecular weight described below. In some embodiments, the $R_3$ and $R_4$ are alkylene.

Representative polyester diols include for example neopentyl glycol adipate diol, butane diol adipate diol; 3-methyl-1,5-pentanediol adipate diol; and 3-methyl-1,5-pentanediol sebecate diol, and dimer acid based polyols in which the dimer acid is derived for example from dimerization of two 18 carbon diacids such as linoleic acid.

In some embodiments, such as the diols just described, the polyester diol comprises a single $R_3$ group (e.g. neopentyl or 3-methyl-1,5-pentyl) and a single $R_4$ group (e.g. adipate).

In other embodiments, the aliphatic polyester diol can be prepared from more than one diol and more than one acid. In this embodiment, the diol can contain two or more different $R_3$ groups and two or more different $R_4$ groups such as in the case of ethylene glycol-hexane diol/adipate-azelate copolyester diol.

In other embodiments, the polyester diol is of the following formula:

$$H[-O-R_6-C(=O)]_n-O-R_5-O-[C(=O)-R_6-O]_o-H$$

wherein $R_5$ and $R_6$ are independently straight or branched chain or cycle-containing alkylene groups that optionally include heteroatoms such as oxygen, the alkylene groups independently comprise 2 to 40 carbon atoms. The subscripts "n" and "o" (i.e. the letter o) are typically independently at least 4, 5 or 6. The subscripts "n" and "o" are typically independently no greater than 25, 20, or 15 to obtain the molecular weight described below.

One representative polyester diol of this type is polycaprolactone diol, such as available from Perstorp. In this embodiment, $R_6$ is a $C_5$ alkylene group and $R_5$ is the residue of an alcohol, such as ethylene glycol, butylene glycol, diethylene glycol, and the like.

In some embodiments, at least one of $R_3$ or $R_4$ or at least one of $R_5$ and $R_6$ is a straight or branched chain or cycle-containing alkylene group independently comprising at least 4, 5, or 6 carbon atoms.

In some embodiments, each of the $R_3$ and $R_4$ groups are alkylene groups independently comprising at least 4, 5, or 6 carbon atoms. In some embodiments, each of the $R_5$ and $R_6$ are alkylene groups independently comprising at least 4, 5, or 6 carbon atoms.

In some embodiment, the urethane (meth)acrylate polymer comprises at least 10, 15, 20, 25, 30, 35, 40, 45, 50, 55, 60, 65, 70, 75, 80, 85, 90% or greater of polyester moieties.

The polyether diol is typically of the formula as follows:

$$H[O-R_7]_l-OH,$$

wherein each $R_7$ is independently selected from straight or branched chain or cycle-containing alkylene groups of 2 to 6 carbon atoms. In some embodiments, $R_7$ is ethylene and/or propylene (i.e. 2-3 carbon atoms). In other embodiments, $R_7$ has at least 3 or 4 carbon atoms. The number of repeat units, l is typically at least 5, 6, 7, 8, 9, or 10 ranging up to 20, 30, 40, 50 60, 70, or 80 or greater to obtain the molecular weight described below.

In some embodiment, the urethane (meth)acrylate polymer comprises at least 10, 15, 20, 25, 30, 35, 40, 45, 50, 55, 60, 65, 70, 75, 80, 85, 90% or greater of polyalkylene oxide moieties.

The values of l, m, n, and o are chosen such that the molecular weight (Mn) of the diol is at least 500, 600, 700, 800, 900, or 1000 g/mole. In some embodiments, the molecular weight (Mn) of the diol is at least 1100, 1200, 1300, 1400, 1500 g/mole. In some embodiments, the molecular weight (Mn) of the diol is at least 1600, 1700, 1800, 1900, or 2000 g/mole. In some embodiments, the molecular weight (Mn) of the diol is no greater than 10,000; 9,000; 8,000; 7,000; 6,000; 5000; 4000; or 3000 g/mole. The molecular weight of the diol can be determined from the —OH value, that can be determined by titration.

When the molecular weight is too low the elongation can be insufficient (i.e. less than 15-20%). The values of m, n, and o can vary widely due to the range of carbons for the $R_3$, $R_4$, $R_5$, $R_6$ and $R_7$ groups. In some embodiments, the weighted average of the diols (e.g. at least one diol with pendent cyclic moieties and at least one diol lacking pendent cyclic moieties) typically meets the molecular weight criteria just described. For example, components containing two diols could include a 1:2 molar ratio of a first diol having a Mn of about 500 g/mol to a second diol having a Mn of about 1,500 g/mol, resulting in a weighted average Mn of 1,167 g/mol. In some embodiments, the diol or weighted average of the diol is at least 1000 g/mol, 1,500 g/mol or greater.

Various diisocyanates can be used in the preparation of the urethane (meth)acrylate polymer. In typical embodiments, useful diisocyanates can be characterized by the formula $R_{di}(NCO)_2$, wherein $R_{di}$ is the aliphatic and/or aromatic moiety between the isocyanate groups. Once reacted, $R_{di}$ is also commonly referred to as the residue of the diisocyanate.

Specific examples of suitable diisocyanates include for example 2,6-toluene diisocyanate (TDI), 2,4-toluene diisocyanate, methylenedicyclohexylene-4,4'-diisocyanate (H12MDI), 3-isocyanatomethyl-3,5,5-trimethylcyclohexyl isocyanate (IPDI), 1,6-diisocyanatohexane (HDI), tetramethyl-m-xylylene diisocyanate, a mixture of 2,2,4- and 2,4,4-trimethyl-1,6-diisocyanatohexane (TMXDI), trans-1,4-hydrogenated xylylene diisocyanates (H6XDI), cyclohexyl-1,4-diisocyanate, 4,4'-methylene diphenyl diisocyanate, 2,4'-methylene diphenyl diisocyanate, a mixture of 4,4'-methylene diphenyl diisocyanate and 2,4'-methylene diphenyl diisocyanate, 1,5-naphthalene diisocyanate, 1,4-tetramethylene diisocyanate, 1,4-phenylene diisocyanate, 2,6- and 2,4-toluene diisocyanate, 1,5-naphthylene diisocyanate, 2,4' and 4,4'-diphenylmethane diisocyanate, pentamethylene diisocyanate, dodecamethylene diisocyanate, 1,3-cyclopentane diisocyanate, 1,3-cyclohexane diisocyanate, methyl 2,4-cyclohexane diisocyanate, methyl-2,6-cyclohexane diisocyanate, 1,4-bis (isocyanatomethyl) cyclohexane, 1,3-bis (isocyanatomethyl) cyclohexane, 4,4'-toluidine diisocyanate, 4,4'-diphenyl ether diisocyanate, 1,3- or 1,4-xylylene diisocyanate, lysine diisocyanate methyl ester, 3,3'-dimethyl-4,4'-diphenylmethane diisocyanate, 3,3'-dimethyl-phenylene diisocyanate, 2,5-bis (isocyanate methyl)-bicyclo[2.2.1]heptane, 2,6-bis (isocyanate methyl)-bicyclo[2.2.1]heptane, bis (2-isocyanate ethyl) fumarate, 4-diphenylpropane diisocyanate, trans-cyclohexane-1,4-diisocyanatehydrogenated dimer acid diisocyanate, a norbornene diisocyanate, methylenebis 6-isopropyl-1,3-phenyl diisocyanate, and combinations thereof. In some embodiments, the diisocyanate comprises IPDI.

Various hydroxy functional (meth)acrylates can be used in the preparation of the urethane (meth)acrylate polymer. In typical embodiments, the hydroxy functional (meth)acrylate has the following formula:

$$HO-Q-(A)_p$$

wherein Q is a polyvalent (e.g. divalent or trivalent) organic linking group, A has the formula $-OC(=O)C(R_1)=CH_2$ wherein $R_1$ is H or alkyl of 1 to 4 carbon atoms (e.g. methyl), and p is 1 or 2.

In some embodiments, Q is a straight or branched chain or cycle-containing aliphatic (e.g. divalent) connecting group, such an alkylene. In other embodiments, Q is an aromatic (e.g. divalent) connecting group, such as arylene, aralkylene, and alkarylene. Q can optionally include heteroatoms such as O, N, and S, and combinations thereof. Q can also optionally include a heteroatom-containing functional group such as carbonyl or sulfonyl, and combinations thereof. Q typically comprises no greater than 20 carbon atoms. In some embodiments, A is a methacryl functional group.

In some embodiments, Q is typically alkylene comprising no greater than 12, 10, 8 or 6 carbon atoms. In some embodiments, Q is a $C_2$, $C_3$, or $C_4$ alkylene group. In some embodiments, p is 1. In some embodiments A is methacrylate.

Suitable examples of hydroxy functional (meth)acrylates include for example, 2-hydroxyethyl methacrylate, hydroxypropyl methacrylate (all isomers), hydroxybutyl methacrylate (all isomers), poly(e-caprolactone) mono[2-methacryloxy ethyl] esters, glycerol dimethacrylate, 1-(acryloxy)-3-(methacryloxy)-2-propanol, 2-hydroxy-3-phenyloxypropyl methacrylate, 2-hydroxyalkyl methacryloyl phosphate, 4-hydroxycyclohexyl methacrylate, trimethylolpropane dimethacrylate, trimethylolethane dimethacrylate, 1,4-butanediol monomethacrylate, neopentyl glycol monomethacrylate, 1,6-hexanediol monomethacrylate, 3-chloro-2-hydroxypropyl methacrylate, 2-hydroxy-3-alkyloxymethacrylate, polyethylene glycol monomethacrylate, polypropylene glycol monomethacrylate, —OH terminated ethylene oxide-modified phthalic acid methacrylate, and 4-hydroxycyclohexyl methacrylate.

In some embodiments, a diol (meth)acrylate can be used in the preparation of the urethane (meth)acrylate polymer. In typical embodiments, the diol (meth)acrylate has the following formula:

A-Q-(OH)$_2$ wherein Q is a trivalent organic linking group and A has the formula —OC(=O)C(R$_1$)=CH$_2$ wherein R$_1$ is H or alkyl of 1 to 4 carbon atoms (e.g. methyl). Q and A can be the same as described above.

Examples of the diol (meth)acrylate include, glycerol-2-methacrylate (1,3-bis hydroxy-propyl-2-methacrylate), 2,3-dihydroxypropyl methacrylate, glycerin mono(meth)acrylate, trimethylolpropane monoacrylate, trimethylolpropane monomethacrylate. Additional suitable diol (meth)acrylates may be synthesized as described in the Examples below, for instance an acrylated diol adduct of diethanolamine and isocyanatoethyl methacrylate, an acrylated diol adduct of diethanolamine and isocyanatoethyl acrylate, an acrylated diol adduct of diethanolamine and isocyanatoethoxyethyl methacrylate, and an acrylated diol adduct of ethylene glycol mono-acetoacetate mono-methacrylate and 2-hydroxyethyl acrylate.

In typical embodiments, the isocyanate functional (meth)acrylate has the following formula:

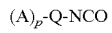

(A)$_p$-Q-NCO wherein A, Q, and p are the same as described above with respect to the hydroxyl functional (meth)acrylate.

Examples of the isocyanate functional (meth)acrylates include isocyanatoethyl methacrylate, isocyanatoethoxyethyl methacrylate, isocyanatoethyl acrylate, and 1,1-(bisacryloyloxymethyl) ethyl isocyanate, which are for instance commercially available from Showa Denko (Tokyo, Japan).

In the preparation of the urethane (meth)acrylate polymer the equivalence of isocyanate groups (diisocyanate or isocyanate functional (meth)acrylate) is about equal to the equivalence of hydroxyl groups of the diol(s) and hydroxyl functional (meth)acrylate(s). Typically, the diol(s) and/or hydroxyl functional (meth)acrylate(s) are present such that there is a slight excess of hydroxyl groups resulting in substantially all the isocyanate groups being consumed during the polymerization.

The equivalent ratio of reactive compounds (e.g. diols) lacking pendent cyclic moieties to reactive compounds (e.g. diols) comprising a pendent cyclic moiety typically ranges from 1.5:1 to 5:1. In some embodiments, the ratio is at least 2:1. In some embodiments, the ratio is no greater than 4:1. However, when the diisocyanate lacks cyclic (e.g. isophorone) groups, a higher concentration of reactive compounds (e.g. diols) comprising pendent cyclic moieties can be utilized.

The equivalent ratio of diols lacking a (meth)acrylate group to diols comprising a (meth)acrylate group typically ranges from 5:1 to 1:1. In some embodiments, the ratio is at least 4:1 or 3:1.

When there is a higher molar equivalence of hydroxyl functional (meth)acrylate than diol, increasing concentrations of the reaction product of the diisocyanate with only the hydroxyl functional (meth)acrylate (at the exclusion of the diol) can be produced as a by-product. The selection of diisocyanate can also result in higher concentrations of by-product. For example, when hydrogenated methylene diisocyanate (H12MDI) is utilized instead of isophorone diisocyanate (IPDI), higher concentrations of byproduct are produced. Additionally, for materials made at the same ratio of diisocyanate:diol:hydroxyl functional (meth)acrylate, materials made with higher molecular weight diols have lower weight percentages of the by-product than materials made with lower with lower molecular weight diols.

The urethane (meth)acrylate polymer typically has a number average molecular weight (Mn) of at least 500 g/mol and in some embodiments at least 750 g/mol, 1,000 g/mol, 1,250 g/mol, 1500 g/mol, 1,750 g/mol or 2,000 g/mol. In some embodiments, the urethane methacrylate polymer has a number average molecular weight (Mn) of at least 2,500 g/mol, 3,000 g/mol, 3,500 g/mol, 4,000 g/mol, 4,500 g/mol, 5,000 g/mol, 5,500 g/mol or 6,000 g/mol. The urethane (meth)acrylate polymer typically has a number average molecular weight (Mn) no greater than 25,000 g/mol. In some embodiments, the urethane (meth)acrylate polymer has a number average molecular weight (Mn) of no greater than 20,000 g/mol, 15,000 g/mol or 10,000 g/mol.

The urethane (meth)acrylate polymer typically has a weight average molecular weight (Mw) of at least 2000 g/mol and in some embodiments at least 2,500 g/mol, 3,000 g/mol, or 3500 g/mol. In some embodiments, the urethane methacrylate polymer has a weight average molecular weight (Mw) of at least 4,000 g/mol, 5,000 g/mol, 6,000 g/mol, 7,000 g/mol, 8,000 g/mol, 9,000 g/mol, or 10,000 g/mol. The urethane (meth)acrylate polymer typically has a weight average molecular weight (Mw) no greater than 50,000 g/mol, 45,000 g/mol, 40,000 g/mol, 35,000 g/mol, or 30,000 g/mol. Higher molecular weight urethane (meth)acrylates will result in higher viscosity resin formulations with comparable compositions and concentrations, that increase the viscosity. When the molecular weight is too low, the cured composition can fail to yield and/or exhibit insufficient elongation (i.e. less than 15-20%). The lower molecular weight urethane (meth)acrylate polymers may be characterized as oligomers.

Molecular weight (Mw and Mn) of the urethane (meth)acrylate polymer is determined by GPC as described in the example section.

In some embodiments, the polymerizable composition further comprises other difunctional (e.g. di(meth)acrylate) components.

In some embodiments, the composition further comprises a difunctional (e.g. di(meth)acrylate) (e.g. by-product) component that is the reaction product of the same diisocyanate and same hydroxy functional (meth)acrylate as that of the urethane (meth)acrylate polymer.

Such polyurethane (meth)acrylate can be represented by the following formula:

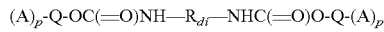

wherein A, Q, and p, are the same as previously described for the hydroxy functional (meth)acrylate and $R_{di}$ is a residue of a diisocyanate as previously described. In some embodiments, A is methacrylate.

When the hydroxyl functional (meth)acrylate is HEMA and the diisocyanate is IPDI, the polyurethane (meth)acrylate has the following formula:

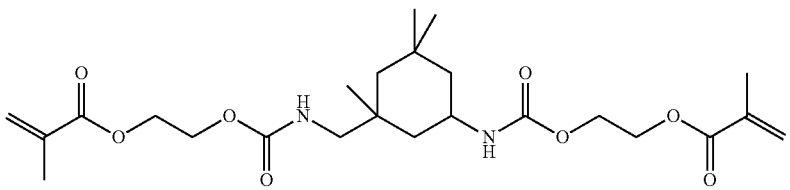 [SMILES: C=C(C)C(=O)OCCOC(=O)NCC1(C)CC(NC(=O)OCCOC(=O)C(=C)C)CC(C)(C)C1]

The amount of polyurethane (meth)acrylate lacking diol moieties (e.g. by-product) that is formed during the polymerization can vary. In some embodiments, polyurethane (meth)acrylate lacking diol moieties (e.g. by-product) is present in amounts less than 3, 2, or 1 wt. % based on the total weight of the polyurethane components of the composition (or about half such amount based on the total amount of polymerizable organic components). In other embodiments, the concentration may range up to a 25 wt-% based on the total weight of the polyurethane components of the composition (or about half such amount based on the total amount of polymerizable organic components).

The presence of such polyurethane (meth)acrylate lacking diol moieties may advantageously improve crosslinking thereby increasing the modulus of the photopolymerized reaction product. In view of such benefits, such polyurethane (meth)acrylate lacking diol moieties can be prepared separately and be added to the polymerizable composition if desired, in addition to being present as a reaction by-product.

The urethane (meth)acrylate polymer (e.g. comprising polymerized units of an (e.g. aliphatic) polycarbonate or polyester or polyalkylene diol) described herein is the primary difunctional (e.g. di(meth)acrylate) component of the free-radically polymerizable resin composition. The total amount of urethane (meth)acrylate polymer is typically at least 30, 35, or 40 wt. % based on the total weight of the free-radically polymerizable resin (e.g. excluding inorganic components, such as filler.) The total amount of urethane (meth)acrylate polymer is typically no greater than 70, 65, or 60 wt. %.

In some embodiments, the weight ratio of the monofunctional (meth)acrylate monomer(s) to urethane (meth)acrylate polymer (e.g. comprising polymerized units of an aliphatic polycarbonate or polyester or polyalkylene oxide diol) can range from 2:1 to 1:2 or 1.5:1 to 1:1.5.

The polymerizable composition comprises 30-70 wt. % of (meth)acrylate monomers. The (meth)acrylate monomer may comprise a monofunctional (meth)acrylate monomer, a multifunctional (meth)acrylate monomer, or a combination thereof.

In some embodiments, the polymerizable composition comprises a multifunctional (meth)acrylate monomer comprising pendent cyclic groups.

In some embodiments, the multifunctional (meth)acrylate monomer is a fluorene-containing monomer having the following general structure:

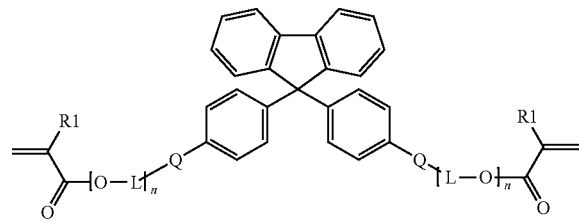

wherein each Q is independently O or S. L is a divalent linking group. L may independently comprise a branched or linear $C_2$-$C_{12}$ alkylene group and n ranges from 0 to 10 (i.e. 1, 2, 3, 4, 5, 6, 7, 8, 9, or 10). L typically comprises a branched or linear $C_2$-$C_6$ alkylene group. More typically L is $C_2$ or $C_3$. The carbon chain of the alkylene linking group may optionally be substituted with one or more hydroxy groups. For example, L may be —$CH_2CH(OH)CH_2$—. Typically, the linking groups are the same. $R_1$ is independently hydrogen or methyl. The multifunctional (meth) acrylate monomer comprising pendent cyclic groups can be prepared from a diol. Thus, the central polycyclic group wherein Q is O can alternatively be derived from any of the previously described diol structures having pendent cyclic groups.

Another multifunctional (meth)acrylate monomer comprising pendent cyclic groups is a binaphthyl-containing monomer such as ([1,1'-binaphthalene]-2,2'-diylbis(oxy))bis (ethane-2,1-diyl) diacrylate (depicted as follows), available as KAYARAD BNP-1 from Nippon Kayaku Co. Ltd. Tokyo, Japan.

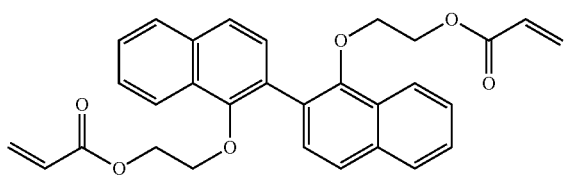 [SMILES: C=CC(=O)OCCOc1c(-c2ccc3ccccc3c2OCCOC(=O)C=C)ccc2ccccc12]

In some embodiments, the polymerizable composition comprises multifunctional (meth)acrylate monomer comprising pendent cyclic groups is an amount of at least 1, 2, 3, 4, or 5 wt. % of the polymerizable organic components. In some embodiments, the concentration is no greater than 10 wt. %.

The polymerizable composition comprises at least one monofunctional (meth)acrylate monomer. In some embodiments, the total amount of monofunctional (meth)acrylate monomer(s) is typically at least 30, 35, or 40 wt. % based on the total weight of the organic components of the composition (e.g. excluding inorganic components, such as filler.) The total amount of monofunctional (meth)acrylate monomer(s) is typically no greater than 70, 65, or 60 wt. %.

In some embodiments, the weight ratio of (meth)acrylate monomer(s) to urethane (meth)acrylate polymer can range from 2:1 to 1:2 or 1.5:1 to 1:1.5.

The polymerizable composition comprises one or more "high Tg" (e.g. monofunctional) (meth)acrylate monomers, i.e. wherein a cured homopolymer of such (e.g. monofunctional) (meth)acrylate monomer has a Tg of at least 30, 35, 40, 45, 50, 55, 60, 65, 70, 75, 80, 85 or 90° C. In some embodiments, the polymerizable composition comprises at least one (e.g. monofunctional) (meth)acrylate monomer wherein a cured homopolymer of such monomer has a Tg of at least 95, 100, 105, 110, 115, 120, 125, 130, 135, 140, 145, 150, 155, 160, 165, 170, 175, 180, 185 or 190° C. The Tg of the homopolymer of the (e.g. monofunctional) (meth)acrylate monomer is typically no greater than about 260° C. For example, 1-adamantyl methacrylate decomposes at about 260° C. In some embodiments, the Tg of the homopolymer of the (e.g. monofunctional) (meth)acrylate monomer is no greater than 255, 250, 245, 240, 235, 230, 225, 220, 215, 210, 205 or 200° C.

Often, the Tg of a homopolymer of a monomer is known from published literature. Table 1 describes the Tg of the homopolymer of various (meth)acrylate monomers that may be used in the polymerizable composition of the orthodontic articles described herein. In some embodiments, a single isomer may be used. In other embodiments, a mixture of isomers may be used. Combinations of (e.g. monofunctional) (meth)acrylate monomer(s) can be utilized. In some embodiments, the monofunctional (meth)acrylate monomer is a methacrylate.

In some embodiments, the monofunctional (meth)acrylate monomer comprises a cyclic moiety. Although the cyclic moiety may be aromatic, in typical embodiments, the cyclic moiety is a cycloaliphatic. Suitable monofunctional (meth)acrylate monomers include for example 3,3,5-trimethylcyclohexyl (meth)acrylate, butyl-cyclohexyl(meth)acrylate, 2-decahydronapthyl (meth)acrylate, 1-adamantyl (meth)acrylate, dicyclopentadienyl (meth)acrylate, bornyl (meth)acrylate including isobornyl (meth)acrylate, dimethyl-1-adamantyl (meth)acrylate, and 3-tetracyclo[4.4.0.1.1]dodecyl methacrylate.

TABLE 1

Reported glass transition temperature ($T_g$) and calculated log P (log of octanol/water partition coefficient) of homopolymers of monofunctional (meth)acrylate monomers.

| Monomer | Tg (° C.) | $T_g$ Reference | Calculated log P |
| --- | --- | --- | --- |
| 3,3,5-trimethylcyclohexyl acrylate | 15 | Hopfinger et. al.; J. Polym. Sci. B., Polym. Phys. 1988, 26, 2007 | 4.38 |
| d,l-isobornyl acrylate | 94 | Jakubowski et. al. Polymer, 2008, 49, 1567 | 4.22 |
| dicyclopentanyl acrylate | 103 | U.S. Pat. No. 4,591,626 | 3.69 |
| 3,5-dimethyl-1-adamantyl acrylate | 105 | Matsumoto, A. et.al. Macromolecules 1991, 24, 4017 | 4.63 |
| cyclohexyl methacrylate | 107 | Wilson, P. S., Simha, R.; Macromolecules, 1973, 95, 3, 902 | 3.41 |
| tert-butyl methacrylate | 113 | Matsumoto, A. et.al. Macromolecules 1991, 24, 4017 | 2.57 |
| 3,3,5-trimethylcyclohexyl methacrylate | 125 | Hopfinger et. al.; J. Polym. Sci. B., Polym. Phys. 1988, 26, 2007 | 4.93 |
| cis-4-tert-butyl-cyclohexylmethacrylate | 132 | Matsumoto, A. et.al. Macromolecules 1993, 26, 7, 1659 | 5.13 |
| 2-decahydronapthyl methacrylate | 145 | Matsumoto, A. et. al., J. Polym. Sci. A., Polym. Chem. 1993, 31, 2531 | 4.95 |
| 1-adamantyl acrylate | 153 | Matsumoto, A. et.al. Macromolecules 1991, 24, 4017 | 3.68 |
| Mixture of 73% trans-4-tert-butylcyclohexylmethacrylate/27% cis-4-tert-butylcyclohexylmethacrylate | 163 | Matsumoto, A. et.al. Macromolecules 1993, 26, 7, 1659 | 5.13 |
| dicyclopentanyl methacrylate | 173 | U.S. Pat. No. 4,591,626 | 4.24 |

TABLE 1-continued

Reported glass transition temperature ($T_g$) and calculated log P (log of octanol/water partition coefficient) of homopolymers of monofunctional (meth)acrylate monomers.

| Monomer | Tg (° C.) | $T_g$ Reference | Calculated log P |
|---|---|---|---|
| trans-4-tert-butylcyclohexyl methacrylate | 178 | Matsumoto, A. et.al. Macromolecules 1993, 26, 7, 1659 | 5.13 |
| d,l-isobornyl methacrylate | 191 | Matsumoto, A. et. al., J. Polym. Sci. A., Polym. Chem. 1993, 31, 2531 | 4.77 |
| 3,5-dimethyl-1-adamantyl methacrylate | 194 | Matsumoto, A. et.al. Macromolecules 1991, 24, 4017 | 5.19 |
| d,l-bornyl methacrylate | 194 | Matsumoto, A. et. al., J. Polym. Sci. A., Polym. Chem. 1993, 31, 2531 | 4.77 |
| 3-tetracyclo[4.4.0.1.1]dodecyl methacrylate | 199 | Matsumoto, A. et. al., J. Polym. Sci. A., Polym. Chem. 1993, 31, 2531 | 4.66 |
| 1-adamantyl methacrylate | >253 | Matsumoto, A. et.al. Macromolecules 1991, 24, 4017 | 4.23 |
| 2-ethylhexyl methacrylate | −10 | Fleischhaker et. al., Macromol. Chem. Phys. 2014, 215, 1192. | 4.88 |
| tetrahydrofurfuryl methacrylate | 60 | E.I. du Pont de Nemours & Co., Ind. Eng. Chem., 1936, 28, 1160, | 1.38 |
| 2-phenoxyethyl methacrylate | 47 | Song et. al.; J. Phys. Chem. B 2010, 114, 7172 | 3.26 |
| N-vinyl pyrrolidone | 180 | Turner et. al; Polymer, 1985, 26, 757 | 0.37 |
| carboxyethyl acrylate | <30 | Fang et. al.; Int. J. Adhes. and Adhes. 84 (2018) 387-393 | 0.60 |
| 2-hydroxyethyl methacrylate | 105 | Russell et. al.; J. Polym. Sci. Polym. Phys, 1980, 18, 1271 | 0.50 |
| acryloyl morpholine | 147 | Elles, J.; Chimie Moderne, 1959, 4, 26, 53 | −0.94 |

In some embodiments, a balance of physical properties (e.g., strength and elongation at break) can be obtained in a polymerized article when including both a monofunctional reactive diluent having a $T_g$ of less than 25° C. and a monofunctional reactive diluent having a $T_g$ of 25° C. or greater.

The selection and concentration of the (e.g. monofunctional) (meth)acrylate monomer(s) contributes to providing a two-phase system wherein the polymerized composition yields and exhibits a sufficient elongation (e.g. at least 15-20%). When the Tg of the (e.g. monofunctional) (meth)acrylate monomer(s) is too low, the cured compositions may not have the properties needed to move teeth. When the amount of high Tg (e.g. monofunctional) (meth)acrylate monomer(s) is too high, the polymerized composition can also be too brittle, failing to yield after soaking in water and exhibiting insufficient elongation.

When the polymerized composition contacts an aqueous environment during normal use, such as in the case of orthodontic (e.g. aligner) articles, it is advantageous to utilize materials that have low affinity for water. One way to express the affinity for water of (meth)acrylate monomers is by calculation of the partition coefficient between water and an immiscible solvent, such as octanol. This can serve as a quantitative descriptor of hydrophilicity or lipophilicity. The octanol/water partition coefficient can be calculated by software programs such as ACD ChemSketch, (Advanced Chemistry Development, Inc., Toronto, Canada) using the log P module. In some embodiments, the (e.g. monofunctional) (meth)acrylate monomer has a calculated log P value of greater than 1, 1.5, 2, 2.5, or 3. In some embodiments, the (e.g. monofunctional) (meth)acrylate monomer has a calculated log P value of greater than 3.5, 4. 4.5, or 5. The calculated log P value is typically no greater than 12.5. In some embodiments, the calculated log P value is no greater than 12, 11.5, 11, 10.5, 10, 9.5, 9, 8.5, 8, 7.5, 7, 6.5, 6, or 5.5.

In some embodiments, the polymerizable composition optionally further comprises a (e.g. monofunctional) (meth)acrylate monomer having a high affinity for water, i.e. having a log P value of less than 3, 2.5, 2.0, 1.5, or 1. When present such monomer(s) are present, such monomer(s) having a high affinity for water are typically present in an amount less than the (e.g. monofunctional) (meth)acrylate monomer(s) having a low affinity for water. Thus, the concentration of (meth)acrylate monomer(s) having a high affinity for water is typically no greater than 50, 45, 40, 35, 30, or 25 wt. % of the total (meth)acrylate monomer(s). In some embodiments, the concentration of monofunctional (meth)acrylate monomer(s) having a high affinity for water is no greater than 24, 23, 22, 21, 20, 19, 18, 17, 16, 15, 14, 13, 12, 11, 10, 9, 8, 7, 6, 5, 4, 3, 2, or 1 wt. % of the total monofunctional (meth)acrylate monomer(s).

In some embodiments, the total polymerized composition comprises no greater than 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 wt.-% of reactive diluents (e.g. (meth)acrylate monomer(s)) having a high affinity for water. In some embodiment, the total polymerized composition comprises at least 1, 2, 3, 4, 5, 6, 7, 8, 9, 10, 11, 12, 13, 14, 15, 16, 17, 18, 19, or 20 wt. % of reactive diluents (e.g.

(meth)acrylate monomer(s)) having a high affinity for water. In some embodiments, the (meth)acrylate monomer(s) having a high affinity for water is an ethylenically unsaturated component with acid functionality such as described in; filed May 21, 2019 incorporated herein by reference.

The polymerizable compositions may optionally include other difunctional (meth)acrylate monomer(s) or polymer(s). The other difunctional (meth)acrylate monomer(s) or polymer(s) may include the reaction product of diisocyanates and hydroxy functional (meth)acrylates as previously described that were not utilized in the preparation of the urethane (meth)acrylate polymer.

The optional difunctional (e.g. di(meth)acrylate) monomer(s) or polymer(s) can include other urethane (meth)acrylate polymers, such as urethane (meth)acrylate polymers that comprise aromatic moieties or polyether moieties. The other difunctional (e.g. di(meth)acrylate) monomer(s) or polymer(s) can include urethane (meth)acrylate monomer, oligomers, or polymers having a lower molecular weight.

The optional difunctional (e.g. di(meth)acrylate) monomer(s) or polymer(s) can include other di(meth)acrylate monomers that lack urethane moieties, such as 1,12-dodecanediol dimethacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, tripropylene glycol diacrylate, or any combination thereof. Further suitable difunctional monomers include the di(meth)acrylates of each of the above listed diacrylates.

The total amount of other difunctional (e.g. di(meth)acrylate) components (including by-product) can be at least 0.5, 1, 2, 3, 4, or 5 wt. % based on the total weight of the polymerizable organic components of the composition. In some embodiments, the total amount difunctional (e.g. di(meth)acrylate) components (including by-product) is no greater than 20, 19, 18, 17, 16, or 15 wt. %. In some embodiments, the total amount difunctional (e.g. di(meth)acrylate) components including by-product) is no greater than 14, 13, 12, 11, or 10 wt. %.

The urethane (meth)acrylate is the major high molecular weight urethane (meth)acrylate polymer. When other lower molecular weight urethane (meth)acrylate components (polymers, oligomer, or monomers) and/or or difunctional (e.g. di(meth)acrylate) components are present, the weight ratio of high molecular weight urethane (meth)acrylate polymer to the total of other urethane (meth)acrylate components and/or or difunctional (e.g. di(meth)acrylate) components typically ranges from 1:1 to 25:1. In some embodiments, the weight ratio of high molecular weight urethane (meth)acrylate to the total of other urethane (meth)acrylate components and/or or difunctional (e.g. di(meth)acrylate) components is at least 2:1, 3:1, or 4:1.

In favored embodiments, the urethane (meth)acrylate polymer has a low affinity for water. In this embodiment, the urethane (meth)acrylate polymer comprises little or no oxygen-containing moieties that are not polyester or polycarbonate moieties, urethane moieties, or (meth)acrylate moieties. For example, the polyester urethane (meth)acrylate comprises little or no polyether moieties such as polyethylene oxide moieties. Further, the urethane (meth)acrylate comprises little or no pendent hydroxyl moieties. In some embodiments, the wt. % of polyether moieties is no greater than 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 wt.-% of the polymerizable resin.

Photoinitiator

Photopolymerizable compositions of the present disclosure include at least one photoinitiator. Suitable exemplary photoinitiators are those available under the trade designations OMNIRAD from IGM Resins (Waalwijk, The Netherlands) and include 1-hydroxycyclohexyl phenyl ketone (OMNIRAD 184), 2,2-dimethoxy-1,2-diphenylethan-1-one (OMNIRAD 651), bis(2,4,6 trimethylbenzoyl)phenylphosphineoxide (OMNIRAD 819), 1-[4-(2-hydroxyethoxy)phenyl]-2-hydroxy-2-methyl-1-propane-1-one (OMNIRAD 2959), 2-benzyl-2-dimethylamino-1-(4-morpholinophenyl) butanone (OMNIRAD 369), 2-Dimethylamino-2-(4-methyl-benzyl)-1-(4-morpholin-4-yl-phenyl)-butan-1-one (OMNIRAD 379), 2-methyl-1-[4-(methylthio)phenyl]-2-morpholinopropan-1-one (OMNIRAD 907), Oligo[2-hydroxy-2-methyl-1-[4-(1-methylvinyl)phenyl]propanone]

ESACURE ONE (Lamberti S. p. A., Gallarate, Italy), 2-hydroxy-2-methyl-1-phenyl propan-1-one (DAROCUR 1173), 2, 4, 6-trimethylbenzoyldiphenylphosphine oxide (OMNIRAD TPO), and 2, 4, 6-trimethylbenzoylphenyl phosphinate (OMNIRAD TPO-L). Additional suitable photoinitiators include for example and without limitation, benzyl dimethyl ketal, 2-methyl-2-hydroxypropiophenone, benzoin methyl ether, benzoin isopropyl ether, anisoin methyl ether, aromatic sulfonyl chlorides, photoactive oximes, and combinations thereof.

In some embodiments, a photoinitiator is present in a photopolymerizable composition in an amount of up to about 5% by weight, based on the total weight of polymerizable components in the photopolymerizable composition. In some embodiments, a photoinitiator is present in an amount of 0.1, 0.2, 0.3, 0.4, 0.5, 0.6, 0.7, 0.8, 0.9, or 1.0 wt. %, based on the total weight of the polymerizable organic components of the composition. In some embodiments, a photoinitiator is present in an amount of at least 1.25 or 1.5 wt. %. The amount of photoinitiator is typically no greater than 5, 4.5, 4, 3.5, 3, 2.5 or 2 wt. %.

Further, a thermal initiator can optionally be present in a photopolymerizable composition described herein. In some embodiments, a thermal initiator is present in a photopolymerizable composition or in an amount of up to about 5% by weight, based on the total weight of polymerizable components in the photopolymerizable composition. In some cases, a thermal initiator is present in an amount of about 0.1-5% by weight, based on the total weight of polymerizable components in the photopolymerizable composition. Suitable thermal initiators include for instance and without limitation, peroxides such as benzoyl peroxide, dibenzoyl peroxide, dilauryl peroxide, cyclohexane peroxide, methyl ethyl ketone peroxide, hydroperoxides, e.g., tert-butyl hydroperoxide and cumene hydroperoxide, dicyclohexyl peroxydicarbonate, 2,2,-azo-bis(isobutyronitrile), and t-butyl perbenzoate. Examples of commercially available thermal initiators include initiators available from DuPont Specialty Chemical (Wilmington, DE) under the VAZO trade designation including VAZO 67 (2,2'-azo-bis(2-methybutyronitrile)) VAZO 64 (2,2'-azo-bis(isobutyronitrile)) and VAZO 52 (2,2'-azo-bis(2,2-dimethyvaleronitrile)), and LUCIDOL 70 from Elf Atochem North America, Philadelphia, PA.

In some embodiments, the use of more than one initiator assists in increasing the percentage of monomer that gets incorporated into the reaction product of polymerizable components and thus decreasing the percentage of the monomer that remains uncured.

In some embodiments, the photoinitiator may be polymeric or a macromolecule, as described in U.S. Patent Application No. 62/769,375 filed Nov. 19, 2018. In other embodiments, a first photoinitiator and a second free-radical initiator are utilized. The second free-radical initiator is a thermal initiator or a photoinitator having sufficient absorbance at a different wavelength range than the first photoinitiator. Such combination of photoinitiators is described in U.S. Patent Application No. 62/769,305 filed Nov. 19, 2018; incorporated herein by reference.

Catalyst

The polymerizable composition typically comprises a catalyst. The amount of catalyst is typically 0.01 wt. % to 5 wt. %, based on the total weight of the polymerizable organic components.

Examples of suitable catalysts include for example, dioctyl dilaurate (DOTDL), stannous octoate, dibutyltin diacetate, dibutyltin dilaurate, dibutyltin mercaptide, dibutyltin thiocarboxylate, dibutyltin dimaleate, dioctyltin mercaptide, dioctyltin thiocarboxylate, lead 2-ethylhexanoate, tetra-alkyl titanates such as tetrabutyl titanate (TBT), triethylamine, N, N-dimethylcyclohexylamine, N-methylmorpholine, N-ethylmorpholine, N, N-dimethyl-p-toluidine, beta-(dimethylamino) propionitrile, N-methylpyrrolidone, N, N-dicyclohexylmethylamine, dimethylaminoethanol, dimethyl-amino-ethoxyethanol, triethylenediamine, N, N, N'-trimethyl aminoethyl ethanol amine, N, N, N', N'-tetramethylethylenediamine, N, N, N', N'-tetramethyl-1,3-diamine, N, N, N', N'-tetramethyl-1,6-hexanediol-diamine, bis(N, N-dimethylaminoethyl) ether, N'-cyclohexyl-N, N-dimethyl-formamidine, N, N'-dimethylpiperazine, trimethyl piperazine, bis(aminopropyl) piperazine, N-(N, N'-dimethylaminoethyl) morpholine, bis(morpholinoethyl) ether, 1,2-dimethyl imidazole, N-methylimidazole, 1,4-diamidines, diazabicyclo-[2.2.2]-octane (DABCO), 1,4-diazabicyclo [3.3.0]-oct-4-ene (DBN), 1,8-diazabicyclo-[4.3.0]-non-5-ene (DBN), 1,8-diazabicyclo[5.4.0]-undec-7-ene (DBU), and phenol salts, salts such as octyl acid salts, N, N, N', N'''-pentamethyldiethylenetriamine, N, N, N', N'''-pentamethyl dipropylenetriamine, tetramethylguanidine, N-cyclohexyl-N', N', N'', N''-tetramethyl guanidine, N-methyl-N'-(2-dimethyl amino ethyl) piperazine, 1,3,5-tris (N, N-dimethyl-propyl)-hexahydro-1,3,5-triazine.

In some embodiments, the catalyst comprises zinc, an amine, tin, zirconium, or bismuth. The catalyst can comprise tin, such as dibutyltin diacrylate. Preferably, however, the catalyst is free of tin, as tin catalysts may not be desirable to include in orthodontic articles that will be in contact with a patient's mouth.

The catalyst may comprise an organometallic zinc complex that is free of 2-ethylhexyl carboxylate and 2-ethylhexanoic acid, such as the zinc catalyst commercially available from King Industries, Inc. (Norwalk, CT) under the trade designation K-KAT XK-672, and/or other zinc catalysts available from King Industries, such as K-KAT XK-661, and K-KAT XK-635. Another suitable catalyst is bismuth neodecanoate, for instance commercially available from Sigma-Aldrich (St. Louis, MO), as well as bismuth catalysts available from King Industries under the trade designations K-KAT XK-651 and K-KAT 348. Available aluminum based catalysts include K-KAT 5218 from King Industries. Further, zirconium based catalysts include K-KAT 4205 and K-KAT 6212 available from King Industries.

Additives

Polymerizable compositions described herein typically further comprise one or more additives, such as inhibitors, stabilizing agents, sensitizers, absorption modifiers, fillers and combinations thereof.

In addition, a photopolymerizable material composition described herein can further comprise one or more sensitizers to increase the effectiveness of one or more photoinitiators that may also be present. In some embodiments, a sensitizer comprises isopropylthioxanthone (ITX) or 2-chlorothioxanthone (CTX). Other sensitizers may also be used. If used in the photopolymerizable composition, a sensitizer can be present in an amount ranging of about 0.01% by weight or about 1% by weight, based on the total weight of the photopolymerizable composition.

A photopolymerizable composition described herein optionally also comprises one or more polymerization inhibitors or stabilizing agents. A polymerization inhibitor is often included in a photopolymerizable composition to provide additional thermal stability to the composition. A stabilizing agent, in some instances, comprises one or more anti-oxidants. Any anti-oxidant not inconsistent with the objectives of the present disclosure may be used. In some embodiments, for example, suitable anti-oxidants include various aryl compounds, including butylated hydroxytoluene (BHT), which can also be used as a polymerization inhibitor in embodiments described herein. In addition to or as an alternative, a polymerization inhibitor comprises methoxyhydroquinone (MEHQ).

In some embodiments, a polymerization inhibitor, if used, is present in an amount of about 0.001-2% by weight, 0.001 to 1% by weight, or 0.01-1% by weight, based on the total weight of the photopolymerizable composition. Further, if used, a stabilizing agent is present in a photopolymerizable composition described herein in an amount of about 0.1-5% by weight, about 0.5-4% by weight, or about 1-3% by weight, based on the total weight of the photopolymerizable composition.

A photopolymerizable composition as described herein can also comprise one or more UV absorbers including dyes, optical brighteners, pigments, particulate fillers, etc., to control the penetration depth of actinic radiation. One particularly suitable UV absorber include Tinuvin 326 (2-(5-chloro-2H-benzotriazol-2-yl)-6-(1,1-dimethylethyl)-4-methylphenol, obtained from BASF Corporation, Florham Park, NJ Another particularly suitable absorption modifier is Tinopal OB, a benzoxazole, 2,2'-(2,5-thiophenediyl)bis[5-(1,1-dimethylethyl)], also available from BASF Corporation. Another suitable UV absorber is an optical brightener comprising the following compound.

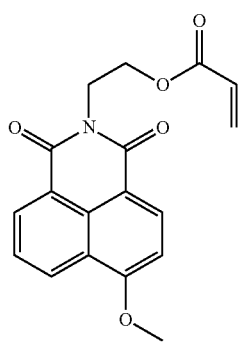 [SMILES: C=CC(=O)OCCN1C(=O)c2cccc3c(OC)ccc(c23)C1=O]

The UV absorber, if used, can be present in an amount of about 0.001-5% by weight, about 0.01-1% by weight, about 0.1-3% by weight, or about 0.1-1% by weight, based on the total weight of the photopolymerizable composition.

Photopolymerizable compositions may include fillers, including nano-scale fillers. Examples of suitable fillers are naturally occurring or synthetic materials including, but not limited to: silica ($SiO_2$ (e.g., quartz)); alumina ($Al_2O_3$), zirconia, nitrides (e.g., silicon nitride); glasses and fillers derived from, for example, Zr, Sr, Ce, Sb, Sn, Ba, Zn, and Al; feldspar; borosilicate glass; kaolin (china clay); talc; zirconia; titania; and submicron silica particles (e.g., pyrogenic silicas such as those available under the trade designations AEROSIL, including "OX 50," "130," "150" and "200" silicas from Degussa Corp., Akron, OH and CAB-O-SIL M5 and TS-720 silica from Cabot Corp., Tuscola, IL). Organic fillers made from polymeric materials are also possible, such as those disclosed in International Publication No. WO09/045752 (Kalgutkar et al.).

The compositions may further contain fibrous reinforcement and colorants such as dyes, pigments, and pigment dyes. Examples of suitable fibrous reinforcement include PGA microfibrils, collagen microfibrils, and others as described in U.S. Pat. No. 6,183,593 (Narang et al.). Examples of suitable colorants as described in U.S. Pat. No. 5,981,621 (Clark et al.) include 1-hydroxy-4-[4-methylphenylamino]-9,10-anthracenedione (FD&C violet No. 2); disodium salt of 6-hydroxy-5-[(4-sulfophenyl)oxo]-2-naphthalenesulfonic acid (FD&C Yellow No. 6); 9-(o-carboxyphenyl)-6-hydroxy-2,4,5,7-tetraiodo-3H-xanthen-3-one, disodium salt, monohydrate (FD&C Red No. 3); and the like.

Discontinuous fibers are also suitable fillers, such as fibers comprising carbon, ceramic, glass, or combinations thereof. Suitable discontinuous fibers can have a variety of compositions, such as ceramic fibers. The ceramic fibers can be produced in continuous lengths, which are chopped or sheared to provide the discontinuous ceramic fibers. The ceramic fibers can be produced from a variety of commercially available ceramic filaments. Examples of filaments useful in forming the ceramic fibers include the ceramic oxide fibers sold under the trademark NEXTEL (3M Company, St. Paul, MN). NEXTEL is a continuous filament ceramic oxide fiber having low elongation and shrinkage at operating temperatures, and offers good chemical resistance, low thermal conductivity, thermal shock resistance, and low porosity. Specific examples of NEXTEL fibers include NEXTEL 312, NEXTEL 440, NEXTEL 550, NEXTEL 610 and NEXTEL 720. NEXTEL 312 and NEXTEL 440 are refractory aluminoborosilicate that includes $Al_2O_3$, $SiO_2$ and $B_2O_3$. NEXTEL 550 and NEXTEL 720 are aluminosilica and NEXTEL 610 is alumina. During manufacture, the NEXTEL filaments are coated with organic sizings or finishes which serves as aids in textile processing. Sizing can include the use of starch, oil, wax or other organic ingredients applied to the filament strand to protect and aid handling. The sizing can be removed from the ceramic filaments by heat cleaning the filaments or ceramic fibers as a temperature of 700° C. for one to four hours.

The ceramic fibers can be cut, milled, or chopped so as to provide relatively uniform lengths, which can be accomplished by cutting continuous filaments of the ceramic material in a mechanical shearing operation or laser cutting operation, among other cutting operations. Given the highly controlled nature of certain cutting operations, the size distribution of the ceramic fibers is very narrow and allow to control the composite property. The length of the ceramic fiber can be determined, for instance, using an optical microscope (Olympus MX61, Tokyo, Japan) fit with a CCD Camera (Olympus DP72, Tokyo, Japan) and analytic software (Olympus Stream Essentials, Tokyo, Japan). Samples may be prepared by spreading representative samplings of the ceramic fiber on a glass slide and measuring the lengths of at least 200 ceramic fibers at 10× magnification.

Suitable fibers include for instance ceramic fibers available under the trade name NEXTEL (available from 3M Company, St. Paul, MN), such as NEXTEL 312, 440, 610 and 720. One presently preferred ceramic fiber comprises polycrystalline α-$Al_2O_3$. Suitable alumina fibers are described, for example, in U.S. Pat. No. 4,954,462 (Wood et al.) and U.S. Pat. No. 5,185,299 (Wood et al.). Exemplary alpha alumina fibers are marketed under the trade designation NEXTEL 610 (3M Company, St. Paul, MN). In some embodiments, the alumina fibers are polycrystalline alpha alumina fibers and comprise, on a theoretical oxide basis, greater than 99 percent by weight $Al_2O_3$ and 0.2-0.5 percent by weight $SiO_2$, based on the total weight of the alumina fibers. In other embodiments, some desirable polycrystalline, alpha alumina fibers comprise alpha alumina having an average grain size of less than one micrometer (or even, in some embodiments, less than 0.5 micrometer). In some embodiments, polycrystalline, alpha alumina fibers have an average tensile strength of at least 1.6 GPa (in some embodiments, at least 2.1 GPa, or even, at least 2.8 GPa). Suitable aluminosilicate fibers are described, for example, in U.S. Pat. No. 4,047,965 (Karst et al). Exemplary aluminosilicate fibers are marketed under the trade designations NEXTEL 440, and NEXTEL 720, by 3M Company (St. Paul, MN). Aluminoborosilicate fibers are described, for example, in U.S. Pat. No. 3,795,524 (Sowman). Exemplary aluminoborosilicate fibers are marketed under the trade designation NEXTEL 312 by 3M Company. Boron nitride fibers can be made, for example, as described in U.S. Pat. No. 3,429,722 (Economy) and U.S. Pat. No. 5,780,154 (Okano et al.).

Ceramic fibers can also be formed from other suitable ceramic oxide filaments. Examples of such ceramic oxide filaments include those available from Central Glass Fiber Co., Ltd. (e.g., EFH75-01, EFH150-31). Also preferred are aluminoborosilicate glass fibers, which contain less than about 2% alkali or are substantially free of alkali (i.e., "E-glass" fibers). E-glass fibers are available from numerous commercial suppliers.

Examples of useful pigments include, without limitation: white pigments, such as titanium oxide, zinc phosphate, zinc sulfide, zinc oxide and lithopone; red and red-orange pigments, such as iron oxide (maroon, red, light red), iron/chrome oxide, cadmium sulfoselenide and cadmium mercury (maroon, red, orange); ultramarine (blue, pink and violet), chrome-tin (pink) manganese (violet), cobalt (violet); orange, yellow and buff pigments such as barium titanate, cadmium sulfide (yellow), chrome (orange, yellow), molybdate (orange), zinc chromate (yellow), nickel titanate (yellow), iron oxide (yellow), nickel tungsten titanium, zinc ferrite and chrome titanate; brown pigments such as iron oxide (buff, brown), manganese/antimony/titanium oxide, manganese titanate, natural siennas (umbers), titanium tungsten manganese; blue-green pigments, such as chrome aluminate (blue), chrome cobalt-alumina (turquoise), iron blue (blue), manganese (blue), chrome and chrome oxide (green) and titanium green; as well as black pigments, such as iron oxide black and carbon black. Combinations of pigments are generally used to achieve the desired color tone in the cured composition.

The use of florescent dyes and pigments can also be beneficial in enabling the printed composition to be viewed under black-light. A particularly useful hydrocarbon soluble fluorescing dye is 2,5-bis(5-tert-butyl-2-benzoxazolyl) 1 thiophene. Fluorescing dyes, such as rhodamine, may also be bound to cationic polymers and incorporated as part of the resin.

If desired, the compositions of the disclosure may contain other additives such as indicators, accelerators, surfactants, wetting agents, antioxidants, tartaric acid, chelating agents, buffering agents, and other similar ingredients that will be apparent to those skilled in the art. Additionally, medicaments or other therapeutic substances can be optionally added to the photopolymerizable compositions. Examples include, but are not limited to, fluoride sources, whitening agents, anticaries agents (e.g., xylitol), remineralizing agents (e.g., calcium phosphate compounds and other calcium sources and phosphate sources), enzymes, breath fresheners, anesthetics, clotting agents, acid neutralizers, chemotherapeutic agents, immune response modifiers, thixotropes, polyols, anti-inflammatory agents, antimicrobial agents, antifungal agents, agents for treating xerostomia, desensitizers, and the like, of the type often used in dental compositions.

Combinations of any of the above additives may also be employed. The selection and amount of any one such additive can be selected by one of skill in the art to accomplish the desired result without undue experimentation.

Photopolymerizable compositions materials herein can also exhibit a variety of desirable properties, non-cured, cured, and as post-cured articles. A photopolymerizable composition, when non-cured, has a viscosity profile consistent with the requirements and parameters of one or more additive manufacturing devices (e.g., 3D printing systems). Advantageously, in many embodiments the photopolymerizable composition contains a minimal amount of (e.g. organic) solvent. For example, the composition may comprise 95% to 100% solids, preferably 100% solids or in other words no greater than 5, 4, 3, 2, 1, or 0.5 wt. % (e.g. organic solvent). In some embodiment, polymerizable and photopolymerizable compositions are described characterized by a dynamic viscosity of about 0.1-1,000 Pa·s, about 0.1-100 Pa·s, or about 1-10 Pa·s using a TA Instruments AR-G2 magnetic bearing rheometer using a 40 mm cone and plate measuring system at 40 degrees Celsius and at a shear rate of 0.1 1/s. In some embodiments, the composition exhibits a dynamic viscosity of less than about 10 Pa·s.

The polymerizable and photopolymerizable compositions described herein are suitable for making various articles, particularly orthodontic articles are described in further detail below.

The shape of the article is not limited, and may comprise a film or a shaped integral article. For instance, a film may readily be prepared by casting the photopolymerizable composition described herein, then subjecting the cast composition to actinic radiation to polymerize the photopolymerizable composition. In many embodiments, the article comprises a shaped integral article, in which more than one variation in dimension is provided by a single integral article. For example, the article can comprise one or more channels, one or more undercuts, one or more perforations, or combinations thereof. Such features are typically not possible to provide in an integral article using conventional molding methods.

The conformability and durability of a cured article made from the photopolymerizable compositions of the present disclosure can be determined in part by standard tensile, modulus, and/or elongation testing. The photopolymerizable compositions can typically be characterized by at least one of the following parameters after hardening.

Figure 11:
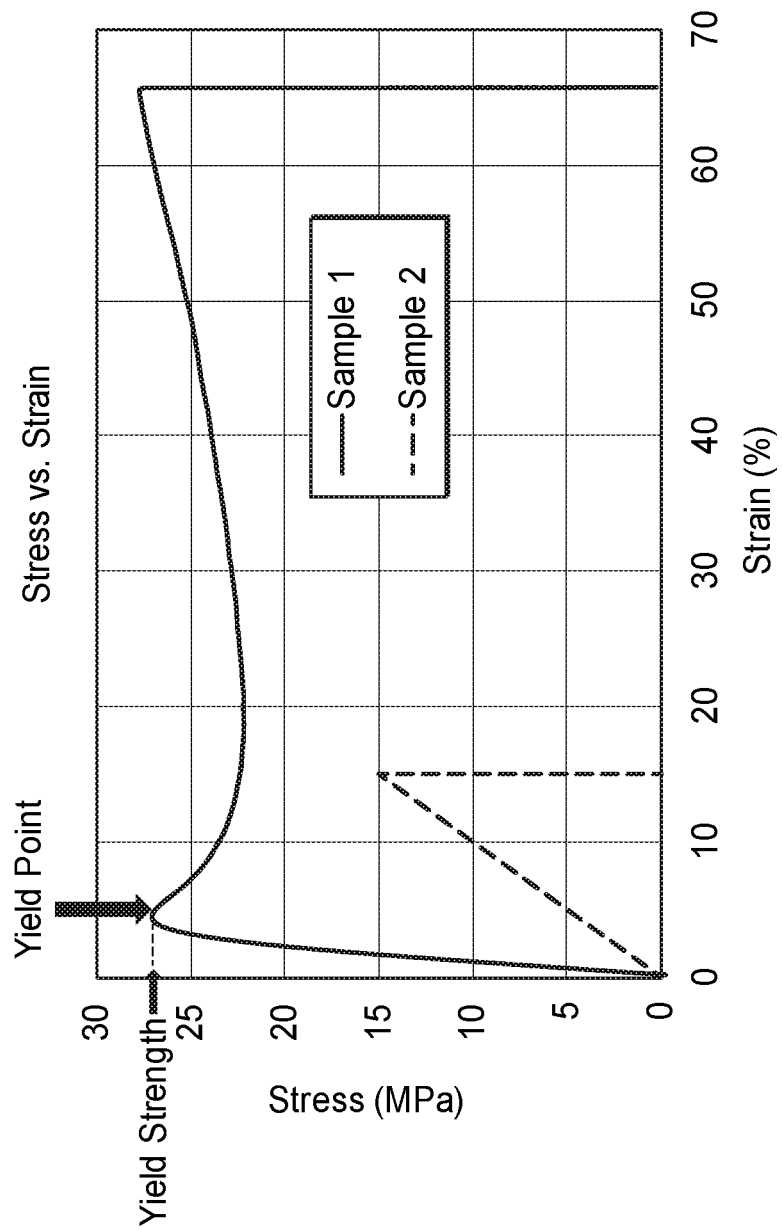
FIG. 11 is a stress-strain curve of a sample that exhibits a yield point (distinct peak prior to a plateau) in comparison to a sample that does not have a yield point.

The cured (i.e. polymerized) composition (or orthodontic article prepared from such article) is of sufficient strength and flexibility such that the cured composition yields. Strength at yield is the maximum point on a stress-strain plot where permanent material deformation begins. An example of a stress-strain plot of a cured composition (e.g. sample 1) that yields is depicted in FIG. 11/12. Such curve has a peak before a plateau region. A stress-strain plot for a (e.g. brittle) cured composition (e.g. sample 2) that does not yield is typically linear over the full range of strain, eventually terminating in fracture without appreciable plastic flow.

In typical embodiments, the tensile strength of the (e.g. casted or printed) cured composition at yield is at least 10, 11, 12, 13, or 14 MPa as determined, as determined according to ASTM-D638-14, using test specimen V, after conditioning (i.e., soaking) of a sample of the material of the orthodontic article in phosphate-buffered saline having a pH of 7.4, for 24 hours at a temperature of 37° C. ("PBS Conditioning"). High tensile strength contributes to the article having sufficient strength to be resilient during use in a patient's mouth. Preferably, the cured composition exhibits a tensile strength at yield of 15 MPa or greater, 17 MPa or greater, 20 MPa or greater, 25 MPa or greater, 30 MPa or greater, 35 MPa or greater. In some embodiments, the tensile yield strength is no greater than about 55 MPa.

The (e.g. casted or printed) cured composition (or orthodontic article prepared from such composition) typically exhibits an elongation at of at least 15, 16, 17, 18%, 19% or 20%, using the same method as just described for the tensile yield strength. In some embodiments, the cured composition exhibits an elongation at break of 25% or greater, 30% or greater, 35% or greater, 40% or greater, 45% or greater, 50% or greater, 55% or greater, 60% or greater, 65% or greater, 70% or greater, 75% or greater, 80% or greater, 85% or greater, 90% or greater, 95% or greater, 100% or greater, 110% or greater, or even 120% or greater. In some embodiments, the elongation is no greater than about 500, 400, 300, or 200%.

In some embodiments, the (e.g. casted or printed) cured composition (or orthodontic article prepared from such composition) exhibits an initial relaxation modulus of 100 megapascals (MPa) or greater measured at 37° C. and 2% strain, as determined by Dynamic Mechanical Analysis (DMA) following conditioning (i.e., soaking) of a sample of the material of the orthodontic article in deionized water for 48 hours at room temperature (i.e., 22 to 25° C.) ("Water Conditioning"). The DMA procedure is described in detail in the Examples below. Preferably, an orthodontic article exhibits an initial relaxation modulus of 200 MPa or greater, 300 MPa or greater, 400 MPa or greater, 500 MPa or greater, 600 MPa or greater, 700 MPa or greater, 800 MPa or greater, 900 MPa or greater, 1,000 MPa or greater, 1,100 MPa or greater, or even 1,200 MPa or greater. In some embodiments, the initial relaxation modulus is no greater than about 3000, 2500, 2000, or 1500 MPa. In some embodiments, the (e.g. casted or printed) cured composition (or orthodontic article prepared from such composition) exhibits a (e.g., 30 minute) relaxation modulus of 100 MPa or greater as determined by DMA following 30 minutes of soaking in water at 37° C. under a 2% strain. The DMA procedure for relaxation modulus is described in detail in the Examples below, and is performed on a sample of the material of the orthodontic article following Water Conditioning and initial relaxation modulus testing. Preferably, an orthodontic article exhibits a (e.g., 30 minute) relaxation modulus of 200 MPa or greater, 300 MPa or greater, 400 MPa or greater, 500 MPa or greater, 600 MPa or greater, 700 MPa or greater, 800 MPa or greater, 900 MPa or greater, or even 1,000 MPa or greater. In some embodiments, the (e.g., 30 minute) relaxation modulus is no greater than about 1500, 1200, 1000, or 800 MPa.

In some embodiments, the (e.g. casted or printed) cured composition (or orthodontic article prepared from such composition) exhibits a percent loss of relaxation modulus of 70% or less as determined by DMA. The loss is determined by comparing the initial relaxation modulus to the (e.g., 30 minute) relaxation modulus at 37° C. and 2% strain. It was discovered that orthodontic articles according to at least certain embodiments of the present disclosure exhibit a smaller loss in relaxation modulus following exposure to water than articles made of different materials. Preferably, an orthodontic article exhibits loss of relaxation modulus of 65% or less, 60% or less, 55% or less, 50% or less, 45% or less 40% or less, or even 35% or less. In some embodiments, the loss of relaxation modulus is 10%, 15%, or 20% or greater.

The cured polymerizable composition (or orthodontic article prepared from such article) typically exhibit a first phase have a peak loss modulus temperature of less than 0, −5, or −10° C. and a second phase have a peak tan delta temperature of greater than 30, 40, 50, 60, 70, or 80° C. In some embodiments, the peak loss modulus temperature is at least −70, −65, −60, −55, or −50° C. In some embodiments, the peak tan delta temperature is no greater than 150, 145, 140, 135, or 130° C. The peak loss modulus and peak tan delta temperatures can be determined according to the dynamic mechanical analysis test method described in the examples. The term peak does not necessarily mean the global maximum value in loss modulus, but can be a local maximum value, or a should on a larger peak. Loss modulus and tan delta are explained, for instance, in Sepe, M. P. (1998 Dynamic Mechanical Analysis for Plastics Engineering. William Andrew Publishing/Plastics Design Library).

In certain embodiments, an article comprises 2 wt. % or less extractable components, 1 wt. % or less, 0.75 wt. % or less, 0.5 wt. % or less, or even 0.1% or less extractable components, based on the total weight of the article. Either an organic (e.g. hexane) solvent or water can be used to extract components. Post-processing of the article to assist in achieving a low concentration of extractables.

The above mechanical properties are particularly well suited for orthodontic articles, for example, that require resiliency and flexibility, along with adequate wear strength and low hygroscopicity.

Methods

In another embodiment, a method of making an (e.g. orthodontic aligner) article is described. The method includes a) providing a photopolymerizable composition as described herein; and b) polymerizing the photopolymerizable composition.

The components are as discussed in detail above. In many embodiments, the photopolymerizable composition of the article is vat polymerized, as discussed in detail below. Optionally, when formed using additive manufacturing methods, the article comprises a plurality of layers.

Photopolymerizable compositions described herein can be mixed by known techniques. In some embodiments, for instance, a method for the preparation of a photopolymerizable composition described herein comprises the steps of mixing all or substantially all of the components of the photopolymerizable composition, heating the mixture, and optionally filtering the heated mixture. Softening the mixture, in some embodiments, is carried out at a temperature of about 50° C. or in a range from about 50° C. to about 85° C. In some embodiments, a photopolymerizable composition described herein is produced by placing all or substantially all components of the composition in a reaction vessel and heating the resulting mixture to a temperature ranging from about 50° C. to about 85° C. with stirring. The heating and stirring are continued until the mixture attains a substantially homogenized state.

In many embodiments, the photopolymerizable composition is vat polymerized, as discussed in detail below.

The shape of the article is not limited, and typically comprises a shaped integral article, in which more than one variation in dimension is provided by a single integral article. For example, the article can comprise one or more channels, one or more undercuts, one or more perforations, or combinations thereof. Such features are typically not possible to provide in an integral article using conventional molding methods. Specific orthodontic articles are described in further detail below.

In many embodiments, the photopolymerizable composition is cured using actinic radiation comprising UV radiation, e-beam radiation, visible radiation, or a combination thereof. Moreover, the method optionally further comprises post curing the article using actinic radiation or heat.

In certain embodiments, the method comprises vat polymerization of the photopolymerizable composition. When vat polymerization is employed, the radiation may be directed through a wall of a container (e.g., a vat) holding the photopolymerizable composition, such as a side wall or a bottom wall.

A photopolymerizable composition described herein in a cured state, in some embodiments, can exhibit one or more desired properties. A photopolymerizable composition in a "cured" state can comprise a photopolymerizable composition that includes a polymerizable component that has been at least partially polymerized and/or crosslinked. For instance, in some instances, a cured article is at least about 10% polymerized or crosslinked or at least about 30% polymerized or crosslinked. In some cases, a cured photopolymerizable composition is at least about 50%, at least about 70%, at least about 80%, or at least about 90% polymerized or crosslinked. A cured photopolymerizable composition can also be between about 10% and about 99% polymerized or crosslinked.

Fabricating an Article

Once prepared as set forth above, the photopolymerizable compositions of the present disclosure may be used in myriad additive manufacturing processes to create a variety of articles, including casting a film or article. A generalized method 100 for creating three-dimensional articles is illustrated in FIG. 1. Each step in the method will be discussed in greater detail below. First, in Step 110 the desired photopolymerizable composition (e.g., comprising a monofunctional (meth)acrylate monomer and polyurethane (meth) acrylate polymer) is provided and introduced into a reservoir, cartridge, or other suitable container for use by or in an additive manufacturing device. The additive manufacturing device selectively cures the photopolymerizable composition according to a set of computerized design instructions in Step 120. In Step 130, Step 110 and/or Step 120 is repeated to form multiple layers to create the article comprising a three-dimensional structure (e.g., a tensile bar). Optionally uncured photopolymerizable composition is removed from the article in Step 140; further optionally, the article is subjected to additional curing to polymerize remaining uncured photopolymerizable components in the article in Step 150; and still further optionally, the article is subjected to heat treatment in Step 160.

Methods of printing a three-dimensional article or object described herein can include forming the article from a plurality of layers of a photopolymerizable composition described herein in a layer-by-layer manner. Further, the layers of a build material composition can be deposited according to an image of the three-dimensional article in a computer readable format. In some or all embodiments, the photopolymerizable composition is deposited according to preselected computer aided design (CAD) parameters.

Additionally, it is to be understood that methods of manufacturing a 3D article described herein can include so-called "stereolithography/vat polymerization" 3D printing methods. Other techniques for three-dimensional manufacturing are known, and may be suitably adapted to use in the applications described herein. More generally, three-dimensional fabrication techniques continue to become available. All such techniques may be adapted to use with photopolymerizable compositions described herein, provided they offer compatible fabrication viscosities and resolutions for the specified article properties. Fabrication may be performed using any of the fabrication technologies described herein, either alone or in various combinations, using data representing a three-dimensional object, which may be reformatted or otherwise adapted as necessary for a particular printing or other fabrication technology.

It is entirely possible to form a 3D article from a photopolymerizable composition described herein using vat polymerization (e.g., stereolithography). For example, in some cases, a method of printing a 3D article comprises retaining a photopolymerizable composition described herein in a fluid state in a container and selectively applying energy to the photopolymerizable composition in the container to solidify at least a portion of a fluid layer of the photopolymerizable composition, thereby forming a hardened layer that defines a cross-section of the 3D article. Additionally, a method described herein can further comprise raising or lowering the hardened layer of photopolymerizable composition to provide a new or second fluid layer of unhardened photopolymerizable composition at the surface of the fluid in the container, followed by again selectively applying energy to the photopolymerizable composition in the container to solidify at least a portion of the new or second fluid layer of the photopolymerizable composition to form a second solidified layer that defines a second cross-section of the 3D article. Further, the first and second cross-sections of the 3D article can be bonded or adhered to one another in the z-direction (or build direction corresponding to the direction of raising or lowering recited above) by the application of the energy for solidifying the photopolymerizable composition. Moreover, selectively applying energy to the photopolymerizable composition in the container can comprise applying actinic radiation, such as UV radiation, visible radiation, or e-beam radiation, having a sufficient energy to cure the photopolymerizable composition. A method described herein can also comprise planarizing a new layer of fluid photopolymerizable composition provided by raising or lowering an elevator platform. Such planarization can be carried out, in some cases, by utilizing a wiper or roller or a recoater. Planarization corrects the thickness of one or more layers prior to curing the material by evening the dispensed material to remove excess material and create a uniformly smooth exposed or flat up-facing surface on the support platform of the printer.

It is further to be understood that the foregoing process can be repeated a selected number of times to provide the 3D article. For example, in some cases, this process can be repeated "n" number of times. Further, it is to be understood that one or more steps of a method described herein, such as a step of selectively applying energy to a layer of photopolymerizable composition, can be carried out according to an image of the 3D article in a computer-readable format. Suitable stereolithography printers include the Viper Pro SLA, available from 3D Systems, Rock Hill, SC and the Asiga PICO PLUS 39, available from Asiga USA, Anaheim Hills, CA.

Figure 2:
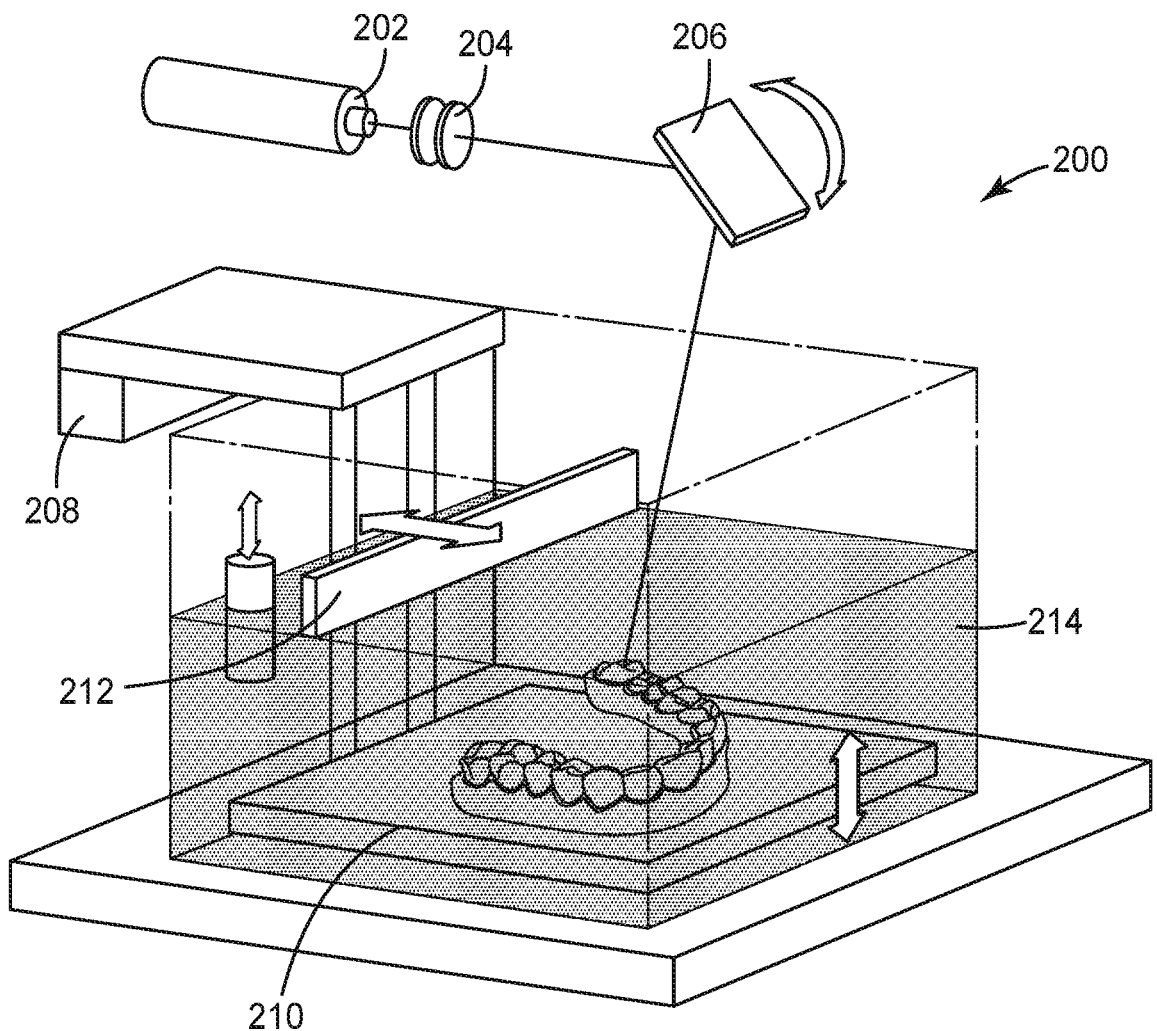
FIG. 2 is a generalized schematic of a stereolithography apparatus.
Figure 3:
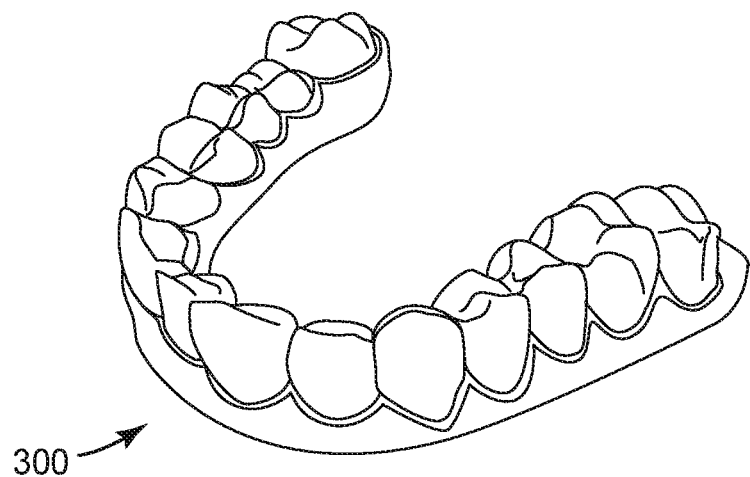
FIG. 3 is an isometric view of a printed clear tray aligner, according to one embodiment of the present disclosure.
Figure 4:
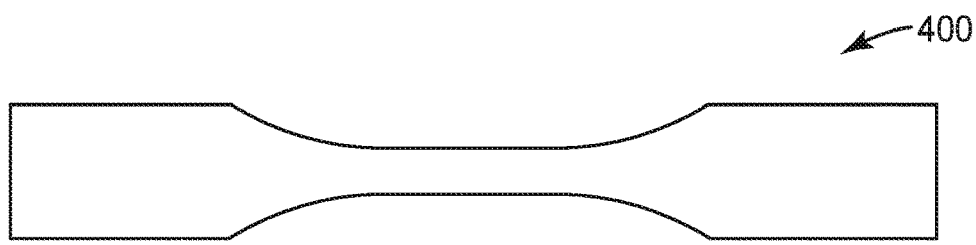
FIG. 4 is an isometric view of a printed tensile bar, according to one embodiment of the present disclosure.

FIG. 2 shows an exemplary stereolithography apparatus ("SLA") that may be used with the photopolymerizable compositions and methods described herein. In general, the SLA 200 may include a laser 202, optics 204, a steering lens 206, an elevator 208, a platform 210, and a straight edge 212, within a vat 214 filled with the photopolymerizable composition. In operation, the laser 202 is steered across a surface of the photopolymerizable composition to cure a cross-section of the photopolymerizable composition, after which the elevator 208 slightly lowers the platform 210 and another cross section is cured. The straight edge 212 may sweep the surface of the cured composition between layers to smooth and normalize the surface prior to addition of a new layer. In other embodiments, the vat 214 may be slowly filled with liquid resin while an article is drawn, layer by layer, onto the top surface of the photopolymerizable composition.

A related technology, vat polymerization with Digital Light Processing ("DLP"), also employs a container of curable polymer (e.g., photopolymerizable composition). However, in a DLP based system, a two-dimensional cross section is projected onto the curable material to cure the desired section of an entire plane transverse to the projected beam at one time. All such curable polymer systems as may be adapted to use with the photopolymerizable compositions described herein are intended to fall within the scope of the term "vat polymerization system" as used herein. In certain embodiments, an apparatus adapted to be used in a continuous mode may be employed, such as an apparatus commercially available from Carbon 3D, Inc. (Redwood City, CA), for instance as described in U.S. Pat. Nos. 9,205,601 and 9,360,757 (both to DeSimone et al.).

Figure 5:
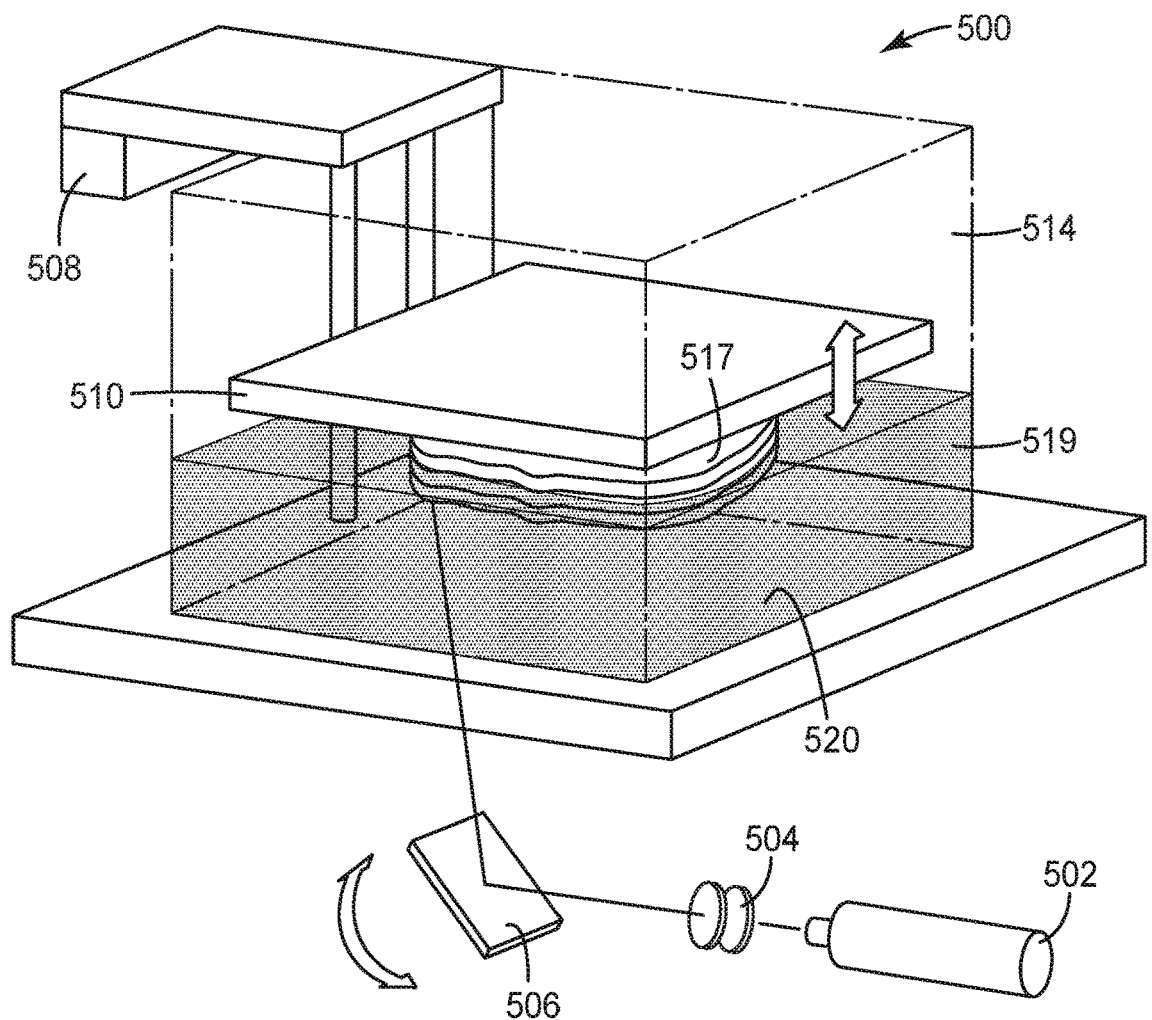
FIG. 5 is a generalized schematic of an apparatus in which radiation is directed through a container.

Referring to FIG. 5, a general schematic is provided of another SLA apparatus that may be used with photopolymerizable compositions and methods described herein. In general, the apparatus 500 may include a laser 502, optics 504, a steering lens 506, an elevator 508, and a platform 510, within a vat 514 filled with the photopolymerizable composition 519. In operation, the laser 502 is steered through a wall 520 (e.g., the floor) of the vat 514 and into the photopolymerizable composition to cure a cross-section of the photopolymerizable composition 519 to form an article 517, after which the elevator 508 slightly raises the platform 510 and another cross section is cured.

More generally, the photopolymerizable composition is typically cured using actinic radiation, such as UV radiation, e-beam radiation, visible radiation, or any combination thereof. The skilled practitioner can select a suitable radiation source and range of wavelengths for a particular application without undue experimentation.

After the 3D article has been formed, it is typically removed from the additive manufacturing apparatus and rinsed, (e.g., an ultrasonic, or bubbling, or spray rinse in a solvent, which would dissolve a portion of the uncured photopolymerizable composition but not the cured, solid state article (e.g., green body). Any other conventional method for cleaning the article and removing uncured material at the article surface may also be utilized. At this stage, the three-dimensional article typically has sufficient green strength for handling in the remaining optional steps of method 100.

It is expected in certain embodiments of the present disclosure that the formed article obtained in Step 120 will shrink (i.e., reduce in volume) such that the dimensions of the article after (optional) Step 150 will be smaller than expected. For example, a cured article may shrink less than 5% in volume, less than 4%, less than 3%, less than 2%, or even less than 1% in volume, which is contrast to other compositions that provide articles that shrink about 6-8% in volume upon optional post curing. The amount of volume percent shrinkage will not typically result in a significant distortion in the shape of the final object. It is particularly contemplated, therefore, that dimensions in the digital representation of the eventual cured article may be scaled according to a global scale factor to compensate for this shrinkage. For example, in some embodiments, at least a portion of the digital article representation can be at least 101% of the desired size of the printed appliance, in some embodiments at least 102%, in some embodiments at least 104%, in some embodiments, at least 105%, and in some embodiments, at least 110%.

A global scale factor may be calculated for any given photopolymerizable composition formulation by creating a calibration part according to Steps 110 and 120 above. The dimensions of the calibration article can be measured prior to post curing.

In general, the three-dimensional article formed by initial additive manufacturing in Step 120, as discussed above, is not fully cured, by which is meant that not all of the photopolymerizable material in the composition has polymerized even after rinsing. Some uncured photopolymerizable material is typically removed from the surface of the printed article during a cleaning process (e.g., optional Step 140). The article surface, as well as the bulk article itself, typically still retains uncured photopolymerizable material, suggesting further cure. Removing residual uncured photopolymerizable composition is particularly useful when the article is going to subsequently be post cured, to minimize uncured residual photopolymerizable composition from undesirably curing directly onto the article.

Further curing can be accomplished by further irradiating with actinic radiation, heating, or both. Exposure to actinic radiation can be accomplished with any convenient radiation source, generally UV radiation, visible radiation, and/or e-beam radiation, for a time ranging from about 10 to over 60 minutes. Heating is generally carried out at a temperature in the range of about 75-150° C., for a time ranging from about 10 to over 60 minutes in an inert atmosphere. So called post cure ovens, which combine UV radiation and thermal energy, are particularly well suited for use in the post cure process of Step 150 and/or Step 160. In general, post curing improves the mechanical properties and stability of the three-dimensional article relative to the same three-dimensional article that is not post cured.

One particularly attractive opportunity for 3D printing is in the direct creation of orthodontic clear tray aligners. These trays, also known as aligners or polymeric or shell appliances, are provided in a series and are intended to be worn in succession, over a period of months, in order to gradually move the teeth in incremental steps towards a desired target arrangement. Some types of clear tray aligners have a row of tooth-shaped receptacles for receiving each tooth of the patient's dental arch, and the receptacles are oriented in slightly different positions from one appliance to the next in order to incrementally urge each tooth toward its desired target position by virtue of the resilient properties of the polymeric material. A variety of methods have been proposed in the past for manufacturing clear tray aligners and other resilient appliances. Typically, positive dental arch models are fabricated for each dental arch using additive manufacturing methods such as stereolithography described above. Subsequently, a sheet of polymeric material is placed over each of the arch models and formed under heat, pressure and/or vacuum to conform to the model teeth of each model arch. The formed sheet is cleaned and trimmed as needed and the resulting arch-shaped appliance is shipped along with the desired number of other appliances to the treating professional.

An aligner or other resilient appliance created directly by 3D printing would eliminate the need to print a mold of the dental arch and further thermoform the appliance. It also would allow new aligner designs and give more degrees of freedom in the treatment plan. Exemplary methods of direct printing clear tray aligners and other resilient orthodontic apparatuses are set forth in PCT Publication Nos. WO2016/109660 (Raby et al.), WO2016/148960 (Cinader et al.), and WO2016/149007 (Oda et al.) as well as U.S. Publication No. 2011/0091832 (Kim, et al.) and U.S. 2013/0095446 (Kitching).

Various dental and orthodontic articles can be created using similar techniques and the photopolymerizable compositions of the present disclosure. Representative examples include, but are not limited to, the removable appliances having occlusal windows described in International Application Publication No. WO2016/109660 (Raby et al.), the removable appliances with a palatal plate described in U.S. Publication No. 2014/0356799 (Cinader et al); and the resilient polymeric arch members described in International Application Nos. WO2016/148960 and WO2016/149007 (Oda et al.); as well as U.S. Publication No. 2008/0248442 (Cinader et al.); and molding techniques and tools for forming a dental restoration in a mouth as described in WO2016/094272 (Hansen et al.) and U.S. Publication No. 2019/0083208 (Hansen et al.). Moreover, the photopolymerizable compositions can be used in the creation of indirect bonding trays, such as those described in International Publication No. WO2015/094842 (Paehl et al.) and U.S. Publication No. 2011/0091832 (Kim, et al.) and other dental articles, including but not limited to crowns, bridges, veneers, inlays, onlays, fillings, and prostheses (e.g., partial or full dentures). Other orthodontic appliances and devices include, but are not limited to, orthodontic brackets, buccal tubes, lingual retainers, orthodontic bands, class II and class III correctors, sleep apnea devices, bite openers, buttons, cleats, and other attachment devices.

In some embodiments, a (e.g., non-transitory) machine-readable medium is employed in additive manufacturing of articles according to at least certain aspects of the present disclosure. Data is typically stored on the machine-readable medium. The data represents a three-dimensional model of an article, which can be accessed by at least one computer processor interfacing with additive manufacturing equipment (e.g., a 3D printer, a manufacturing device, etc.). The data is used to cause the additive manufacturing equipment to create an article comprising a reaction product of a photopolymerizable composition as described herein.

Data representing an article may be generated using computer modeling such as computer aided design (CAD) data. Image data representing the (e.g., polymeric) article design can be exported in STL format, or in any other suitable computer processable format, to the additive manufacturing equipment. Scanning methods to scan a three-dimensional object may also be employed to create the data representing the article. One exemplary technique for acquiring the data is digital scanning. Any other suitable scanning technique may be used for scanning an article, including X-ray radiography, laser scanning, computed tomography (CT), magnetic resonance imaging (MRI), and ultrasound imaging. Other possible scanning methods are described, e.g., in U.S. Patent Application Publication No. 2007/0031791 (Cinader, Jr., et al.). The initial digital data set, which may include both raw data from scanning operations and data representing articles derived from the raw data, can be processed to segment an article design from any surrounding structures (e.g., a support for the article). In embodiments wherein the article is an orthodontic article, scanning techniques may include, for example, scanning a patient's mouth to customize an orthodontic article for the patient.

Figure 10:
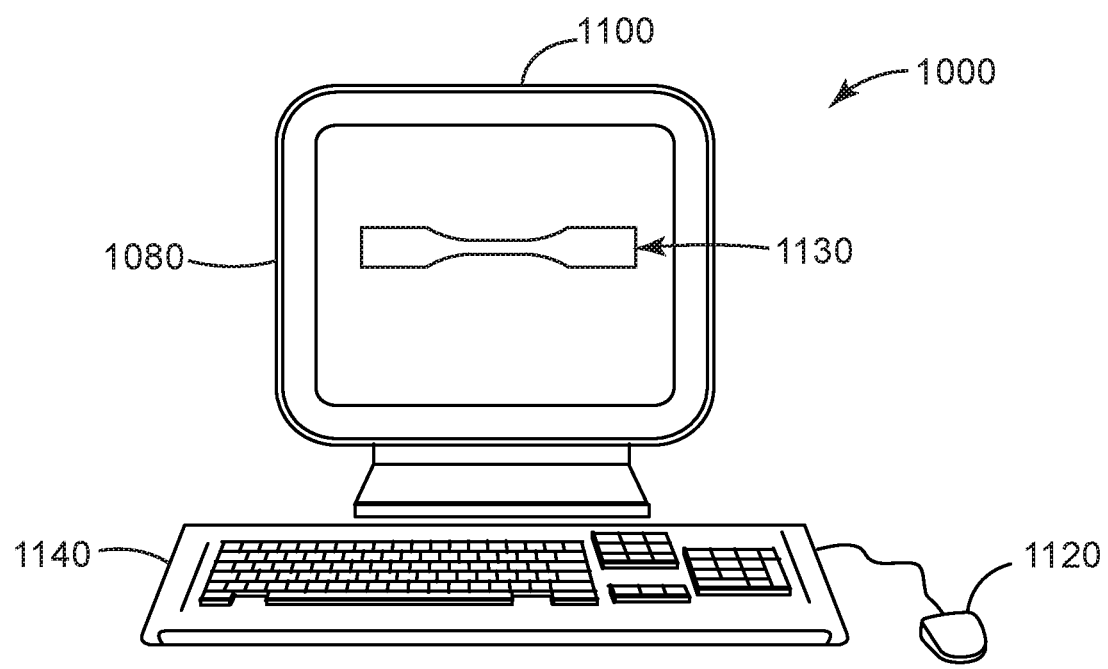
FIG. 10 is a schematic front view of an exemplary computing device 1000.

Often, machine-readable media are provided as part of a computing device. The computing device may have one or more processors, volatile memory (RAM), a device for reading machine-readable media, and input/output devices, such as a display, a keyboard, and a pointing device. Further, a computing device may also include other software, firmware, or combinations thereof, such as an operating system and other application software. A computing device may be, for example, a workstation, a laptop, a personal digital assistant (PDA), a server, a mainframe or any other general-purpose or application-specific computing device. A computing device may read executable software instructions from a computer-readable medium (such as a hard drive, a CD-ROM, or a computer memory), or may receive instructions from another source logically connected to computer, such as another networked computer. Referring to FIG. 10, a computing device 1000 often includes an internal processor 1080, a display 1100 (e.g., a monitor), and one or more input devices such as a keyboard 1140 and a mouse 1120. In FIG. 10, a tensile bar 1130 is shown on the display 1100.

Figure 6:
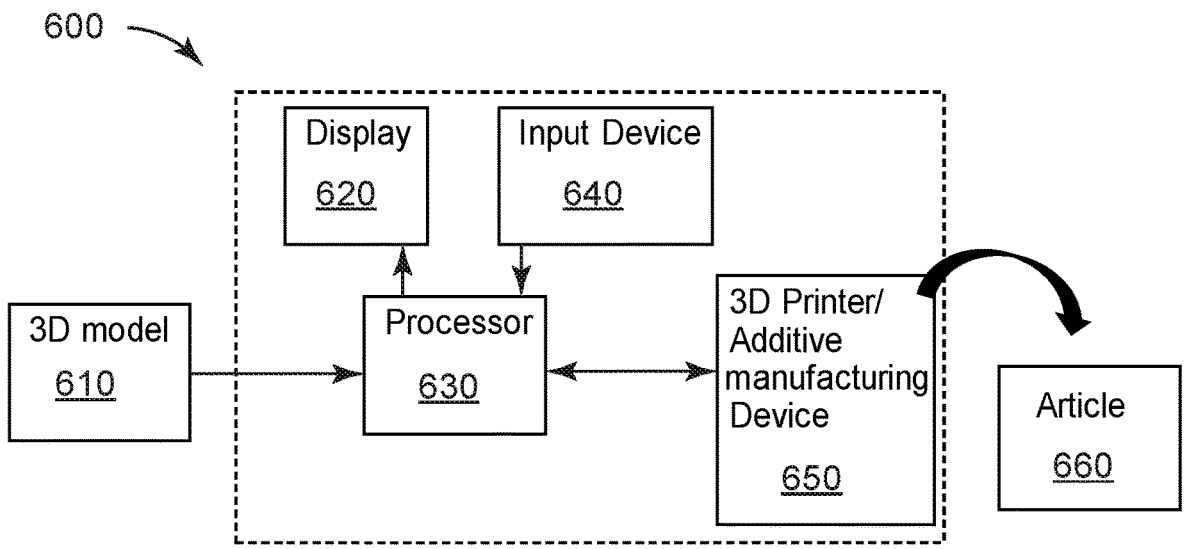
FIG. 6 is a block diagram of a generalized system 600 for additive manufacturing of an article.

Referring to FIG. 6, in certain embodiments, the present disclosure provides a system 600. The system 600 comprises a display 620 that displays a 3D model 610 of an article (e.g., a tensile bar 1130 as shown on the display 1100 of FIG. 10); and one or more processors 630 that, in response to the 3D model 610 selected by a user, cause a 3D printer/additive manufacturing device 650 to create a physical object of the article 660. Often, an input device 640 (e.g., keyboard and/or mouse) is employed with the display 620 and the at least one processor 630, particularly for the user to select the 3D model 610. The article 660 comprises a reaction product of a photopolymerizable composition as described herein.

Figure 7:
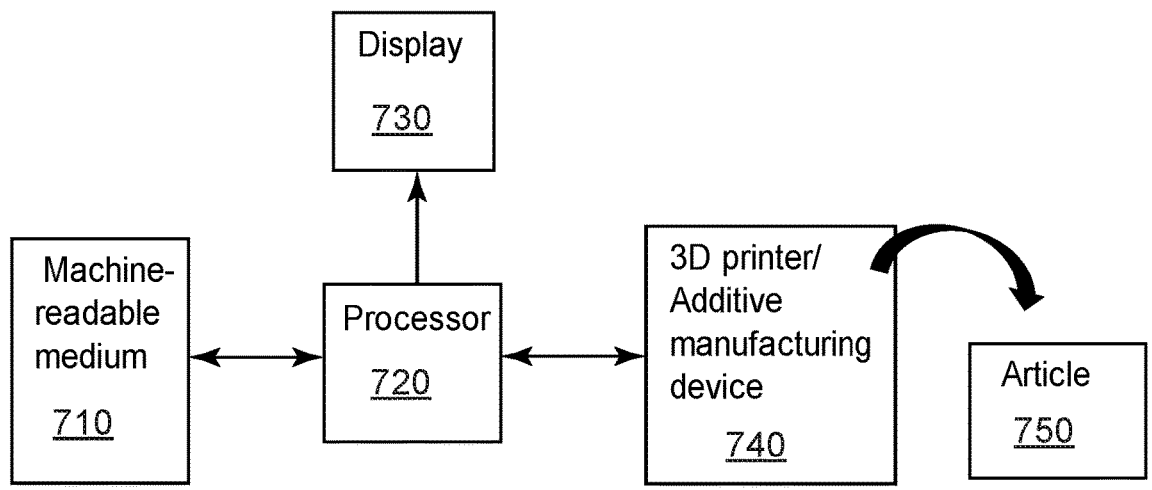
FIG. 7 is a block diagram of a generalized manufacturing process for an article.

Referring to FIG. 7, a processor 720 (or more than one processor) is in communication with each of a machine-readable medium 710 (e.g., a non-transitory medium), a 3D printer/additive manufacturing device 740, and optionally a display 730 for viewing by a user. The 3D printer/additive manufacturing device 740 is configured to make one or more articles 750 based on instructions from the processor 720 providing data representing a 3D model of the article 750 (e.g., a tensile bar 1130 as shown on the display 1100 of FIG. 10) from the machine-readable medium 710.

Figure 8:
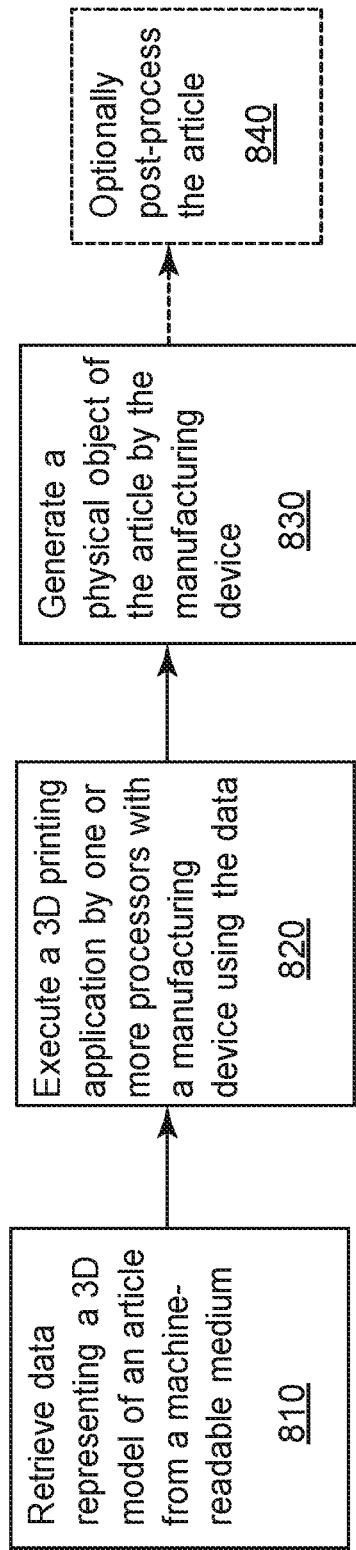
FIG. 8 is a high-level flow chart of an exemplary article manufacturing process.

Referring to FIG. 8, for example and without limitation, an additive manufacturing method comprises retrieving 810, from a (e.g., non-transitory) machine-readable medium, data representing a 3D model of an article according to at least one embodiment of the present disclosure. The method further includes executing 820, by one or more processors, an additive manufacturing application interfacing with a manufacturing device using the data; and generating 830, by the manufacturing device, a physical object of the article. The additive manufacturing equipment can selectively cure a photopolymerizable composition to form an article. The article comprises a reaction product of a photopolymerizable composition as described herein. One or more various optional post-processing steps 840 may be undertaken. Typically, remaining unpolymerized photopolymerizable component may be cured. In certain embodiments, the article comprises an orthodontic article.

Figure 9:
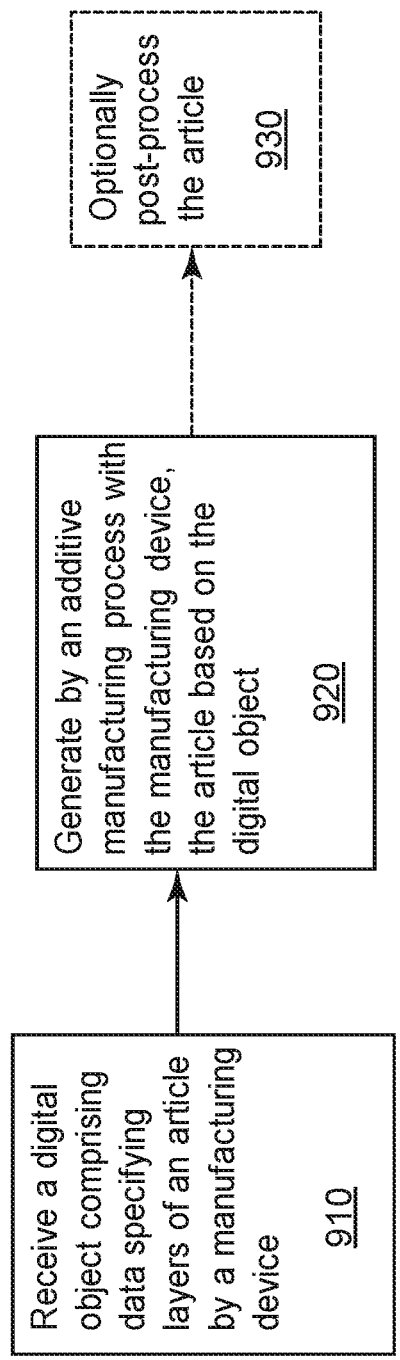
FIG. 9 is a high-level flow chart of an exemplary article additive manufacturing process.

Additionally, referring to FIG. 9, a method of making an article comprises receiving 910, by a manufacturing device having one or more processors, a digital object comprising data specifying a plurality of layers of an article; and generating 920, with the manufacturing device by an additive manufacturing process, the article based on the digital object. Again, the article may undergo one or more steps of post-processing 930.

As used herein, "aliphatic group" means a saturated or unsaturated linear, branched, or cyclic hydrocarbon group. This term is used to encompass alkyl, alkenyl, and alkynyl groups, for example. The term "aliphatic/cycloaliphatic" means a compound or polymer that contains both an aliphatic group and a cycloaliphatic group.

As used herein, "alkyl" means a linear or branched, cyclic or acyclic, saturated monovalent hydrocarbon having from one to thirty-two carbon atoms, e.g., methyl, ethyl, 1-propyl, 2-propyl, pentyl, and the like.

As used herein, the term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

As used herein, "aralkylene" refers to a divalent group that is an alkylene group substituted with an aryl group or an alkylene group attached to an arylene group. The term "alkarylene" refers to a divalent group that is an arylene group substituted with an alkyl group or an arylene group attached to an alkylene group. Unless otherwise indicated, for both groups, the alkyl or alkylene portion typically has from 1 to 20 carbon atoms, 1 to 10 carbon atoms, 1 to 6 carbon atoms, or 1 to 4 carbon atoms. Unless otherwise indicated, for both groups, the aryl or arylene portion typically has from 6 to 20 carbon atoms, 6 to 18 carbon atoms, 6 to 16 carbon atoms, 6 to 12 carbon atoms, or 6 to 10 carbon atoms.

As used herein, the term "glass transition temperature" ($T_g$), of a polymer refers to the transition of a polymer from a glassy state to a rubbery state and can be measured using Differential Scanning calorimetry (DSC), such as at a heating rate of 10° C. per minute in a nitrogen stream. When the $T_g$ of a monomer is mentioned, it is the $T_g$ of a homopolymer of that monomer. The homopolymer must be sufficiently high molecular weight such that the $T_g$ reaches a limiting value, as it is generally appreciated that a $T_g$ of a homopolymer will increase with increasing molecular weight to a limiting value. The homopolymer is also understood to be substantially free of moisture, residual monomer, solvents, and other contaminants that may affect the $T_g$. A suitable DSC method and mode of analysis is as described in Matsumoto, A. et. al., J. Polym. Sci. A., Polym. Chem. 1993, 31, 2531-2539.

As used herein, the term "hardenable" refers to a material that can be cured or solidified, e.g., by heating to remove solvent, heating to cause polymerization, chemical cross-linking, radiation-induced polymerization or crosslinking, or the like.

As used herein, "curing" means the hardening or partial hardening of a composition by any mechanism, e.g., by heat, light, radiation, e-beam, microwave, chemical reaction, or combinations thereof.

As used herein, "cured" refers to a material or composition that has been hardened or partially hardened (e.g., polymerized or crosslinked) by curing.

As used herein, "integral" refers to being made at the same time or being incapable of being separated without damaging one or more of the (integral) parts.

As used herein, the term "(meth)acrylate" is a shorthand reference to acrylate, methacrylate, or combinations thereof, "(meth)acrylic" is a shorthand reference to acrylic, methacrylic, or combinations thereof, and "(meth)acryl" is a shorthand reference to acryl and methacryl groups. "Acryl" refers to derivatives of acrylic acid, such as acrylates and methacrylates. By "(meth)acryl" is meant a monomer or polymer having at least one acryl or methacryl groups, and linked by an aliphatic segment if containing two or more groups. As used herein, "(meth)acrylate-functional compounds" are compounds that include, among other things, a (meth)acrylate moiety.

As used herein, "polymerizable composition" means a hardenable composition that can undergo polymerization upon initiation (e.g., free-radical polymerization initiation). Typically, prior to polymerization (e.g., hardening), the polymerizable composition has a viscosity profile consistent with the requirements and parameters of one or more 3D printing systems. In some embodiments, for instance, hardening comprises irradiating with actinic radiation having sufficient energy to initiate a polymerization or cross-linking reaction. For instance, in some embodiments, ultraviolet (UV) radiation, e-beam radiation, or both, can be used. When actinic radiation can be used, the polymerizable composition is referred to as a "photopolymerizable composition".

As used herein, a "resin" contains all polymerizable components (monomers, oligomers and/or polymers) being present in a hardenable composition. The resin may contain only one polymerizable component compound or a mixture of different polymerizable compounds.

As used herein, the "residue of a diisocyanate", is the structure of the diisocyanate after the —NCO groups are removed. For example, 1,6-hexamethylene diisocyanate has the structure OCN—$(CH_2)_6$—NCO, and its residue, $R_{di}$, after removal of the isocyanate groups is —$(CH_2)_6$—.

| Materials: Table 1 | |
|---|---|
| Material designation | Description |
| 4-hydroxy-TEMPO | 4-hydroxy-2,2,6,6-tetramethylpiperidine 1-oxyl, obtained from Sigma Aldrich, St. Louis, MO. |
| Ammonium formate | Obtained as a 5M aqueous solution from Agilent Technologies, Waldbronn, Germany. |
| A-BPEF | Fluorene diacrylate obtained as NK-Ester A-BPEF from Kowa American Corporation, New York, NY, having 2 total ethylene oxide groups. |
| BAF | Bis-aniline fluorene, obtained as OGSOL BAF from Osaka Gas Chemicals, Osaka, JP, through Marubeni Specialty Chemical, White Plains, NY. |
| BHT | 2,6-di-t-butyl-4-methylphenol obtained from Alfa Aesar, Haverhill, MA. |
| BPEF | Bis-phenoxyethanol fluorene, obtained as OGSOL BPEF from Osaka Gas Chemicals, Osaka, JP, through Marubeni Specialty Chemical, White Plains, NY. |
| C1090 | A polycarbonate diol of about 1000 MW made with about a 9:1 mole ratio of 3-methyl-1,5-pentanediol (MPD): hexane diol (HD), (i.e., 90% MPD,) obtained as "KURARAY POLYOL C-1090" from Kuraray Co. Ltd., Tokyo, Japan. |
| C2050 | A polycarbonate diol of about 2000 MW made with about a 50% (i.e., 5:5) mole ratio of (MPD): (HD), obtained as "KURARAY POLYOL C-2050" from Kuraray Co. Ltd. |
| C3090 | A polycarbonate diol of about 3000 MW made with about a 9:1 mole ratio of (MPD): (HD), obtained as "KURARAY POLYOL C-3090" from Kuraray Co. Ltd. |
| CEA | 2-Caborxyethyl acrylate, obtained from Sigma-Aldrich, St. Louis, MO. |
| CN9782 | An aromatic polyester urethane acrylate from Sartomer, Exton, PA. |
| CN991 | An aliphatic polyester urethane acrylate prepared from caprolactone and H12MDI having an average Mw of about 2000 g/mole, from Sartomer, Exton, PA. |
| DEA | Diethanolamine obtained from Alfa Aesar. |
| Desmodur I (IPDI) | Isophorone diisocyanate, under trade designation "DESMODUR I" equivalent weight 111.11, molecular weight 222.22 g/mole, from Covestro LLC. |
| Exothane-10 | A urethane (meth)acrylate oligomer comprising a polyethylene oxide diol of about 400 MW, obtained as "EXOTHANE-10" from Esstech Inc., Essington, PA. |
| G-AC-MAC | Glycerol acrylate methacrylate (1-(acryloyloxy)-3-(methacryloyloxy)-2-propanol, CAS 1709-71-3), obtained from TCI America, Portland, OR. |
| HEMA | Hydroxyethyl methacrylate, obtained from TCI America, Portland, OR. |
| HR6060 | Fluorene diacrylate Miwon from Miwon, Suji-gu, Yongin-si, Gyeonggi-do, 16864, Korea, as depicted having 5 total ethylene oxide groups. |
| HR6100 | Fluorene diacrylate from Miwon, having 10 total ethylene oxide groups. |
| HR6200 | Fluorene diacrylate from Miwon, having 20 total ethylene oxide groups. |
| IBOA | Isobornyl acrylate, obtained from Alfa Aesar. |
| IBOMA | Isobornyl methacrylate obtained as "SR423A" from Sartomer. |
| IEM | Isocyanatoethyl methacrylate, MW 155.15, available under the trade designation "KARENZ MOI," from Showa Denko. |
| IEM-DEA | Acrylated Diol Adduct of Isocyanatoethyl Methacrylate and Diethanolamine- described below |
| MDI | Product trade designation "MONDUR MLQ," an approximate 80:20 mixture of 4,4' and 2,4' diphenylmethane diisocyanate, equivalent weight 125.125, molecular weight 250.25, from Covestro LLC. |
| NVP | 1-vinyl-2-pyrolidone, obtained from TCI Chemicals, Portland, OR. |

Materials: Table 1

| Material designation | Description |
|---|---|
| P2010 | A 3-methyl-1,5-pentanediol (MPD) adipate polyester diol of about 2000 MW obtained as "KURARAY POLYOL P-2010" from Kuraray Co. Ltd. |
| P2050 | A 3-methyl-1,5-pentanediol (MPD) sebecate (C9 diacid) polyester diol of about 2000 MW obtained as "KURARAY POLYOL P-2050" from Kuraray Co. Ltd. |
| P6010 | A 3-methyl-1,5-pentanediol (MPD) adipate polyester diol of about 6000 MW obtained as "KURARAY POLYOL P-6010" from Kuraray Co. Ltd. |
| PBS | Phosphate buffered saline (PBS, 10×), pH = 7.4, obtained from Alfa Aesar. |
| PEMA | 2-Phenoxy ethyl methacrylate ("SR340"), obtained from Sartomer. |
| Propylene Carbonate | Obtained from Alfa Aesar. |
| PTMO-2000 | A poly(tetramethylene oxide) diol of about 2000 MW, obtained as "POLYTHF 1000" polyether from BASF, Florham Park, NJ. |
| Tinuvin 326 | Phenol, 2-(5-chloro-2H-benzotriazol-2-yl)-6-(1,1-dimethylethyl)-4-methyl, UV-absorber, obtained from BASF. |
| TPO | 2,4,6-trimethylbenzoyldiphenylphosphine oxide photoinitiator obtained as "IRGACURE TPO" from BASF. |
| XK-672 | Zn based catalyst obtained as "K-KAT XK-672" from King Industries, Norwalk, CT. |

Preparation of Acrylated Diol Adduct of Isocyanatoethyl Methacrylate and Diethanolamine (IEM-DEA)

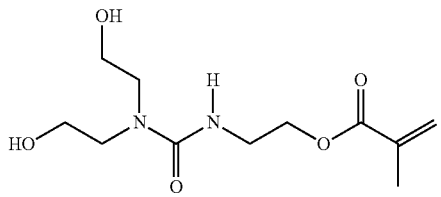

I

To 105.14 g (1 eq) diethanolamine, 0.104 (400 ppm on total solids) BHT, and 0.026 g (100 ppm based on total solids) TEMPO in a 500 ml flask with overhead stirrer in ice, was added 155.15 (1 eq) IEM over 55 min. To keep temp the internal temperature of the reaction under 30 C, ice was at hand to cool water bath. After addition, sample taken for FTIR, showing no —NCO peak at 2265 cm$^{-1}$. Reaction bottled in a polyethylene container and the product was characterized by $^1$H NMR.

Preparation of Urethane (Meth)acrylates Polymers with Pendent Cyclic Moieties

The urethane acrylates are of three main types:

In some cases, the material will comprise a polyol, a diisocyanate, cardo monomer and a hydroxy functional (meth)acrylate. (Type 1).

In some cases, the material will comprise a polyol, a diisocyanate, a cardo monomer and an isocyanato functional (meth)acrylate. (Type 2).

In some cases, the material will comprise a polyol, a diisocyanate, a cardo diol, a diol (meth)acrylate and a hydroxy functional (meth)acrylate. (Type 3).

4 IPDI/2 C2050/1 BPEF/1 HEMA-Polymer 4 (Type 1)

A 250 mL three-necked round-bottom flask with overhead stirrer, under dry air, was charged with 16.26 g IPDI (0.1464 eq), 8.02 g BFEF (0.036593 eq, 219.25 OH EW), and 0.025 g XK-672 (250 ppm), and heated in a 55 C oil bath for 13 min. The setpoint was adjusted to 65 C at 24 min, then to 75 C at 29 min, with clearing of the reaction. At 38 min the setpoint for the reaction was adjusted to 85 C. At 50 min, 70.67 g P2050 (0.073186 eq, OH EW 965.57) was charged to the reaction, and the setpoint was raised to 105 C. At 2 h 15 min, 0.040 g BHT (400 ppm with respect to total solids), was added followed by 5.05 g HEMA (0.038788 eq). At 5.5 h an aliquot was checked by Fourier transform infrared spectroscopy (FTIR) and found to have no —NCO peak at 2265 cm$^{-1}$. The 100 g of solids of product was diluted with 66.7 g IBOMA to provide a clear, viscous liquid.

2 IPDI/3 C2050/1 BPEF/1 IEM-Polymer 11 (Type 2)

A 250 mL three-necked round-bottom flask with overhead stirrer, under dry air, was charged with 9.08 g IPDI (0.081752 eq), 5.97 g BPEF (0.027251 eq), and 0.025 g XK-672 (250 ppm), and heated in an 80 C oil bath for 27 min, at which time the setpoint for the reaction was adjusted to 95 C. At 59 min, 80.46 g C2050 (0.081752 eq, OH EW 984.2) was added and the reaction setpoint was raised to 105 C. At 1 h 49 min, 0.040 g BHT (400 ppm with respect to total solids), and 4.48 g IEM (0.028886 eq) was added. At 7 h, an aliquot was checked by Fourier transform infrared spectroscopy (FTIR) and found to have no —NCO peak at 2265 cm$^{-1}$. Some sample was removed for analysis, and 98.09 g of product was diluted with 65.39 g IBOMA to provide a clear, viscous liquid.

4 IPDI/1 BPEF/0.5 IEM-DEA/1.5 C2050/1 HEMA-Polymer 14 (Type 3)

A 250 mL three-necked round-bottom flask with overhead stirrer, under dry air, was charged with 18.97 g IPDI (0.17072 eq), 9.36 g BPEF (0.04268 eq, 219.25 EW), 2.78 g IEM-DEA (0.02134 eq), 0.040 g BHT (400 ppm with respect to total solids), and 0.025 g XK-672 (250 ppm), and heated to 85 C for for 1 h 10 min. Then 63.01 g C20250 (0.06402 eq, 984.2 EW) was added and the reaction setpoint was adjusted to 95 C, and at 1 h 50 min the setpoint was adjusted to 105 C. At 5 h, an aliquot was checked by Fourier transform infrared spectroscopy (FTIR) and found to have a small —NCO peak at 2265 cm$^{-1}$. At 5h 15 min, 1.08 g more HEMA was added to the reaction, and FTIR analysis at 6 h 45 min showed a marked decrease in the —NCO peak. At 7 h, 0.5 g HEMA was added to the reaction, and at 7 h 40 min, the reaction product weighing 99.01 g was diluted with 66.0 g IBOMA, and heated at 5 h at 115 C, and allowed to cool overnight with stirring. At this FTIR analysis showed a small —NCO peak, and the reaction was reheated to 115 C and isolated as a clear viscous liquid.

Preparation of Urethane (Meth)Acrylates (Lacking Polymeric Diol) IPDI/HEMA (Monomer 1)

A 2 L three-necked round-bottom flask was charged with 685.29 g IPDI (6.168 eq), 0.613 g BHT (400 ppm based on solids), and 0.383 g XK-672 (250 ppm based on solids). Then 846.81 g (6.507 eq) HEMA was added over 3.5 h without heating with the temperature rising to 86 C, then dropping to 67 C. The reaction was heated to 90 C for 9 h, and further stirred without added heat for additional 11 h. At that time, an aliquot was checked by FTIR and found to have no —NCO peak at 2265 cm$^{-1}$.

The urethane (meth)acrylate polymer were prepared by methods according to those of Types 1-3 described above, using the amounts and types of materials indicated in the following table.

TABLE 2

Preparative Examples of Urethane (Meth)Acrylates Polymers-Type 1 Synthesis, 250 ppm XK-672 catalyst and 400 ppm BHT in all examples, unless noted otherwise)

| Polymer | Designation | Isocyanate Type | Isocyanate g | Polyol Type | Polyol g | Diol OH EW | Diol BPEF unless noted otherwise wt. % | (meth)-acrylate mono-ol-HEMA unless noted otherwise g |
|---|---|---|---|---|---|---|---|---|
| Monomer 1 | IPDI-HEMA | IPDI | 685.29 | 0 | 0 | | 0 | 846.81 |
| 2 | 4 IPDI/2 C3090/2 HEMA | IPDI | 219.89 | C3090 | 1449.4 | 1465.75 | 0 | 136.5 |
| 3 | 4 IPDI/1 BPEF/2 C2050/1 HEMA | IPDI | 80.22 | C2050 | 355.30 | 984.2 | 39.58 g (7.9 wt-%) | 24.90 |
| 4 | 4 IPDI/1 BPEF/2 P2050/1 HEMA | IPDI | 16.26 | P2050 | 70.67 | 965.57 | 8.02 | 5.05 |
| 5 | 4 IPDI/1 BPEF /2 C2050/0.5 HEMA/0.5 G-ACMAC | IPDI | 15.79 | C2050 | 69.94 | 984.2 | 7.79 | 2.45 HEMA-C 4.03 ACMAC |
| 6 | 4 IPDI/ 1 BPEF/2 C3090/1 HEMA | IPDI | 11.91 | C3090 | 78.51 | 1464.75 | 5.88 | 3.70 |
| 7 | 4 IPDI/0.833 BPEF/1.66 C2050/1.5 HEMA* | IPDI | 17.96 | C2050 | 66.29 | 984.2 | 7.38 | 8.36 |
| 8 | 4 IPDI/0.67 BPEF/1.33 C2050/2 HEMA | IPDI | 20.40 | C2050 | 60.23 | 984.2 | 6.71 | 12.66 |
| 9 | 4 IPDI/0.5 BAF/2.5 C2050/1 HEMA | IPDI | 14.2 | C2050 | 78.61 | 984.2 | BAF-2.78 | 4.41 |
| 10 | 4 IPDI/1 BPEF/2 P2010/1 HEMA | IPDI | 15.74 | P2010 | 71.61 | 1011 | 7.76 | 4.89 |
| 11 Type 2 | 3 IPDI/1 BPEF/2 C2050/1 IEM | IPDI-IEM-9.08 4.48 | | C2050 | 80.46 | 984.2 | 5.97 | |
| 12 | 4 MDI/1 BPEF/2 P2050/1 HEMA | MDI | 17.70 | C2050 | 69.66 | 984.2 | 7.76 | 4.88 |
| 13 | 4 IPDI/1 BPEF/0.5 P2010/1.5 P2050/1 HEMA | IPDI | 15.97 | P-2010-18.16 | C2050-53.04 | P-2010-1011 C2050-984.2 | 7.88 | 4.96 |
| 14 Type 3 | 4 IPDI/1 BPEF/0.5 IEM-DEA/1.5 P2050/1 HEMA | IPDI | 18.97 | C2050-63.01 | IEM-DEA 2.78 | C2050-984.2 | 9.36 | 5.89 |
| 15 | 4 IPDI/1 BPEF/2 PTMO 2000/1 HEMA | IPDI | 15.86 | PolyTHF 2000 | 71.39 | 1000 | 7.83 | 4.92 |
| 16 | 4 IPDI/1 BPEF/2 P6010/1 HEMA | IPDI | 6.72 | C6010 | 87.88 | 2906.7 | 3.31 | 2.09 |

TABLE 2-continued

Preparative Examples of Urethane (Meth)Acrylates Polymers-Type 1 Synthesis, 250 ppm XK-672 catalyst and 400 ppm BHT in all examples, unless noted otherwise)

| Polymer | Designation | Isocyanate Type | g | Polyol Type | Diol g | Diol OH EW | BPEF unless noted otherwise wt. % | (meth)-acrylate mono-ol-HEMA unless noted otherwise g |
|---|---|---|---|---|---|---|---|---|
| 17 | 4 IPDI/1 BPEF/2 C1090/1 HEMA | IPDI | 24.98 | C1090 | 54.94 | 488.67 | 12.32 | 7.75 |
| Control 18 | 4 IPDI/2.5 C-2050/1.5 HEMA | IPDI | 71.6 | C-2050 | 396.49 | 984.2 | 0 | 31.92 |
| Control 19 | 4 IPDI/2 C-2050/2 HEMA | IPDI | 82.99 | C-2050 | 367.68 | 984.2 | 0 | 49.33 |
| Control 20 | 4 IPDI/3 P-2010/1 HEMA | IPDI | 75.01 | P-2010 | 510.88 | 1009 | 0 | 23.06 |

*included 250 ppm DBTDL

Determination of HEMA-IPDI-HEMA Oligomer Concentration.

Determination of a concentration of HEMA-IPDI-HEMA oligomer was performed by liquid chromatography-mass spectrometry (LC/MS) on an Agilent 1260 Infinity Series liquid chromatography system (Agilent Technologies, Waldbronn, Germany) using an Agilent Poroshell 120 SB-C8 2.1 mm×50 mm 2.7 micrometer column eluted at 40° C. with a flow rate of 0.5 mL per minute. 2 microliter samples were injected and eluted with a linear gradient as described below. The water was Omnisolv HPLC grade from EMD Millipore, a part of Merck KGaA. The re-equilibration time between experiments was 5 minutes. Detection was with an Agilent 6130 Quadrupole LC/MS detector with electrospray ionization. Sample quantification was done by integration of the chromatographic peak detected at 500.3 m/z (M-NH$_4^+$). Mass spectrometer parameters were in atmospheric pressure ionization-electrospray (API-ES) mode: capillary voltage 4 kV, nebulizer gas pressure 50 psig (345 kPa gauge), drying gas flow rate 10 liters per minute, drying gas temperature 300° C.

TABLE 3

| Solvent | Time (min) |
|---|---|
| 6 mM ammonium formate in water | 0 |
| 6 mM ammonium formate in 98% acetonitrile/2% water | 3 |
| 6 mM ammonium formate in 98% acetonitrile/2% water | 5 |
| 89% acetonitrile 10% tetrahydrofuran 1% formic acid | 6 |
| 89% acetonitrile 10% tetrahydrofuran 1% formic acid | 8 |
| 6 mM ammonium formate in water | 9 |

Calibration samples were prepared by dissolution of 0.1009 g of material polyurethane acrylate PE-33 in a 100 mL volumetric flask using ethyl acetate. This solution was then diluted 1 mL into a 100 mL volumetric flask using acetonitrile to produce dilution 1. Dilution 1 was further diluted to ~2.02, 0.505, 0.101 and 0.0121 ppm concentrations in acetonitrile and filtered through 0.22 micron PTFE syringe filters (Fisher Brand, Thermo Fisher Scientific, Hampton, NH). The calibration curve was linear from 2.02-0.0121 ppm. Calibrations were performed directly preceding analytical samples.

Analytical samples were prepared by dissolution of 0.1-0.3 g of material in a 100 mL volumetric flask using ethyl acetate. This solution was then diluted 1 mL into a 100 mL volumetric flask using acetonitrile to produce dilution 1. Dilution 1 was filtered through 0.22 micron PTFE syringe filters (Fisher Brand) and analyzed as discussed above. The results for each sample are shown in the Table 4 below.

| Urethane (Meth)acrylate Polymer | % HEMA-disocyanate-HEMA by-product |
|---|---|
| Polymer 3 | 0.4 |
| Polymer 4 | 0.1 |
| Polymer 6 | 0.1 |
| Polymer 8 | 3.2 |
| Polymer 9 | 0.9 |
| Polymer 16 | 0.3 |

Polymer/Oligomer Molecular Weight Characterization Method:

The molecular weights of the oligomers and the polymers were characterized using gel permeation chromatography (GPC). The GPC equipment consisted of an e2695 Separation Module and a 2414 dRI detector, both from Waters Corporation (Milford, MA). It was operated at a flow rate of 0.6 mL/min using tetrahydrofuran as the eluent. The GPC column was a HSPgel HR MB-M column also from Waters Corporation. The column compartment and differential refractive index detector were set to 35° C. The molecular weight standards were EasiVial PMMA from Agilent Technologies (The $M_p$ values of the PMMA molecular weight standards used in the calibration curve ranged from 550 D to 1,568,000 g/mol.) The relative number average molecular weight (Mn) and weight average molecular weight (Mn) of selected oligomers/polymers are tabulated below in Table 5, in kiloDaltons (kD):

TABLE 5

| Urethane (Meth)acrylate Polymer | Mn (kD) | Mw (kD) | Polydispersity |
|---|---|---|---|
| Polymer 3 | 10.9 | 24.8 | 2.3 |
| Polymer 4 | 10.4 | 23.0 | 2.2 |
| Polymer 5 | 11.5 | 25.4 | 2.2 |
| Polymer 6 | 14.0 | 32.7 | 2.3 |
| Polymer 7 | 3.5 | 9.1 | 2.6 |
| Polymer 8 | 14.4 | 24.6 | 1.7 |
| Polymer 9 | 8.6 | 20.1 | 2.4 |
| Polymer 10 | 10.5 | 16.0 | 1.5 |
| Polymer 11 | 12.4 | 22.0 | 1.8 |
| Polymer 12 | 11.3 | 17.8 | 1.6 |
| Polymer 13 | 10.4 | 23.2 | 2.2 |
| Polymer 14 | 6.7 | 21.6 | 3.2 |
| Polymer 15 | 9.3 | 23.2 | 2.5 |
| Polymer 16 | 17.2 | 45.3 | 2.6 |

General Procedure for Formulation Preparation

Formulations were prepared by weighing the components (indicated in Tables 5-17) in an amber jar, followed by rolling on a roller (having the trade designation "OLDE MIDWAY PRO18" and manufactured by Olde Midway) at 60° C. until mixed.

TABLE 6A

Example formulations (amounts in parts by weight)

| Polymer | Ex. 1 | Ex. 2 | Ex. 3 | Ex. 4 | Ex. 5 | Ex. 6 | Ex. 7 | Ex. 8 |
|---|---|---|---|---|---|---|---|---|
| 3 | 50 | | | | | | | |
| 3 | | 50 | | | | | | |
| 4 | | | 50 | | | | | |
| 5 | | | | 50 | | | | |
| 6 | | | | | 50 | | | |
| 7 | | | | | | 50 | | |
| 8 | | | | | | | 50 | |
| 9 | | | | | | | | 50 |
| IBOMA | 50 | 50 | 50 | 50 | 50 | 50 | 50 | 50 |
| TPO | 2 | 2 | 2 | 2 | 2 | 2 | 2 | 2 |
| BHT | | 0.025 | | | | | | |
| Tinuvin 326 | | 0.025 | | | | | | |

TABLE 6B

Example formulations (amounts in parts by weight)

| PUA | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|
| 10 | 50 | | | | | | | | |
| 11 | | 50 | | | | | | | |
| 12 | | | 50 | | | | | | |
| 13 | | | | 50 | | | | | |
| 14 | | | | | 50 | | | | |
| 15 | | | | | | 50 | | | |
| 16 | | | | | | | 50 | | |
| 17 | | | | | | | | 40 | 50 |
| Monomer 1 | | | | | | | | 10 | |
| IBOMA | 50 | 50 | 50 | 50 | 50 | 50 | 50 | | |
| PEMA | | | | | | | | 50 | |
| IBoA | | | | | | | | | 50 |
| TPO | 2 | 2 | 2 | 2 | 2 | 2 | 2 | 2 | 2 |

TABLE 6C

Example formulations (amounts in parts by weight)

| Component | Ex. 18 | Ex. 19 | Ex. 20 | Ex. 21 |
|---|---|---|---|---|
| Polymer 2 | 45 | 45 | 45 | 45 |
| HR6060 | 5 | | | |

TABLE 6C-continued

Example formulations (amounts in parts by weight)

| Component | Ex. 18 | Ex. 19 | Ex. 20 | Ex. 21 |
|---|---|---|---|---|
| HR6100 | | 5 | | |
| HR6200 | | | 5 | |
| A-BPEF | | | | 5 |
| IBOMA | 50 | 50 | 50 | 50 |
| TPO | 2 | 2 | 2 | 2 |

TABLE 6D

Example formulations (amounts in parts by weight)

| Component | Ex. 22 | Ex. 23 | Ex. 24 |
|---|---|---|---|
| Polymer 18 | 50 | | |
| Polymer 19 | | 50 | |
| Polymer 20 | | | 50 |
| IBoMA | 50 | 50 | 50 |
| TPO | 2 | 2 | 2 |
| Compare to | Ex. 6 | Ex. 7 | Ex. 9 |

TABLE 6E

Example formulations (amounts in parts by weight) - controls without pendent cyclic moieties

| Component | CE-A | CE-B | CE-C |
|---|---|---|---|
| Exothane 10 | 30 | | |
| CN991 | | 20 | 30 |
| CN9782 | | | 10 |
| NVP | 20 | 40 | 60 |
| CEA | 50 | 40 | |
| TPO | 2 | 2 | 2 |

General Procedure of Formulation Casting and Curing

Each formulation indicated in Table 7 was poured into a silicone dogbone mold (Type V mold of 1 mm thickness, ASTM D638-14) for preparing tensile specimens, and a rectangular mold of dimensions (9.4 mm×25.4 mm×1 mm) for DMA 3-point bend test specimens. A 2 mil (0.05 mm) polyethylene terephthalate (PET) release liner (obtained under the trade designation "SCOTCHPAK" from 3M Company (St. Paul, MN)) was rolled on the filled mold, and the filled mold along with the liner was placed between two glass plates held by binder clips. The formulation was cured under a Asiga Pico Flash post-curing chamber (obtained from Asiga USA, Anaheim Hills, CA) for 30 minutes. The specimens were removed from the mold followed by additional light exposure for 30 minutes using the Asiga Pico Flash post-curing chamber. Specimens were then kept in an oven set at 100° C. for 30 minutes. The dogbone specimens were conditioned in Phosphate-buffered saline (PBS, 1×, pH=7.4) for 24 hours at 37° C. The DMA 3-point bend test specimens were conditioned in de-ionized (DI) water for 48 hours at room temperature.

General Procedure for Tensile Testing

PBS conditioned dogbones were tested on an Instron 5944 (Instron, Norwood, MA) with a 500 N load cell. The test speed was 5 mm/minute. The gauge length was set to 1 inch (2.5 cm.) Five replicate samples for each formulation were tested, and the average value are reported. The tensile strength at yield was determined according to ASTM D638-14 (2014) and shown in Table 7 below. For specimens that did not yield, maximum tensile strength was determined. Elongation at break was determined from the crosshead movement of the grips.

General Procedure for the Determination of Relaxation Modulus using Dynamic Mechanical Analysis Rectangular specimens were water conditioned by soaking in deionized water for 48 hours at room temperature at 22 to 25° C. and were tested in a TA Q800 DMA equipped with a submersion 3-point bending clamp. The water conditioned rectangular specimens were placed in water filled submersion fixture, and were equilibrated for 10 minutes at 37° C. After equilibration, a 2% strain was applied and data collection began. Relaxation modulus was measured for 30 minutes using TA Advantage software. The first data point collected is the initial relaxation modulus and the final data point collected at 30 minutes is the relaxation modulus at 30 minutes. The percentage loss in relaxation modulus from its initial value compared to the relaxation modulus at 30 min (termed Percent Loss of Relaxation Modulus After 30 Minutes) was calculated in the following way: 100−((relaxation modulus at 30 min/Initial relaxation modulus)*100)), and is shown in Table 7.

Additive Manufacturing of Formulated Resins

Unless otherwise noted, all 3D-printed examples were manufactured on an Asiga Max, a vat polymerization 3D printer available from Asiga USA, Anaheim Hills, CA.

Formulation 2 listed in Table 6A was photopolymerized on an Asiga 3D printer with a LED light source of 385 nm. Tensile test bars of Type V according to ASTM D638-14 (2014) and DMA 3-point bend test specimens were manufactured. The resin bath of the printer was heated to 40° C. before photopolymerization to reduce the viscosity to be able to manufacture the tensile test bars. The following settings were used for the printing: slice thickness=50 µm; exposure time=6 sec; burn in time=20 sec; burn in layers=1; separation velocity=1.5 mm/s, separation distance=10 mm, approach velocity=1.5 mm/s. The printed parts were washed using propylene carbonate followed by isopropanol to remove unreacted resin. The printed part was then post-cured using a Clearstone CA3200 UV LED curing chamber for 5 minutes on each side followed by heating in an oven at 100° C. for 30 minutes. The dogbone specimens were conditioned in phosphate-buffered saline (PBS, 1×, pH=7.4) for 24 hours at 37° C. The DMA 3-point bend test specimens were conditioned in DI water for 48 hours at room temperature.

TABLE 7

Yield strength, elongation and relaxation modulus of cast and cured formulation

| Sample | Strength at Yield (MPa) | Elongation at Break (%) | Initial Relaxation Modulus (MPa) | Relaxation Modulus at 30 Minutes (MPa) | Percent Loss of Relaxation Modulus After 30 Minutes |
|---|---|---|---|---|---|
| CE-A | DNY | 32.0 | N.M | N.M | N.M |
| CE-B | DNY | 25.5 | N.M | N.M | N.M |
| CE-C | DNY | 1.3 | N.M | N.M | N.M |
| Ex. 1 | 25.1 | 47.2 | 670.0 | 261.9 | 60.91 |
| Ex. 2* | 24.7 | 100.0 | 768.7 | 312.5 | 59.35 |
| Ex. 3 | 19.7 | 143.8 | 501.0 | 148.6 | 70.34 |
| Ex. 4 | 29.4 | 26.3 | 805.0 | 349.6 | 56.57 |
| Ex. 5 | 19.3 | 44.2 | 418.2 | 174.7 | 58.23 |
| Ex. 6 | 34.8 | 24.4 | 923.7 | 380.6 | 58.80 |
| Ex. 7 | 34.3 | 47.3 | 930.5 | 290.7 | 68.76 |
| Ex. 8 | 21.6 | 31.6 | 601.2 | 228.2 | 62.04 |
| Ex. 9 | 17.4 | 132.2 | 570.0 | 234.0 | 58.95 |
| Ex. 10 | 18.3 | 106.1 | 413.5 | 141.8 | 65.71 |
| Ex. 11 | 22.3 | 74.4 | 819.1 | 300.9 | 63.27 |
| Ex. 12 | 24.1 | 40.0 | 579.3 | 220.2 | 62.00 |
| Ex. 13 | 39.4 | 39.6 | 1176.2 | 513.4 | 56.35 |
| Ex. 14 | 14.9 | 201.6 | 299.7 | 46.0 | 84.66 |
| Ex. 15 | 12.3 | 227.7 | 484.3 | 235.8 | 51.31 |
| Ex. 16 | 13.5 | 70.8 | 144.5 | 5.1 | 96.50 |
| Ex. 17 | 29.9 | 48.4 | 633.5 | 73.5 | 88.40 |
| Ex. 18 | 27.2 | 48.4 | 759.9 | 275.1 | 63.79 |
| Ex. 19 | 25.4 | 90.2 | 624.3 | 220.6 | 64.66 |
| Ex. 20 | 23.6 | 106.8 | 643.1 | 215.2 | 66.54 |
| Ex. 21 | 30.7 | 69.1 | 940.3 | 390.8 | 58.44 |
| Ex. 22 | 20.2 | 90.3 | 565.6 | 182.2 | 67.79 |
| Ex. 23 | 26.9 | 54.4 | 765.0 | 264.7 | 65.40 |
| Ex. 24 | 13.7 | 230.1 | 461.4 | 180.7 | 60.84 |

N.M Not measured
*Printed
DNY: Did not yield.

What is claimed is:

1. An orthodontic article comprising a reaction product of a polymerizable composition comprising:
    a) 30-70 parts by weight of (meth)acrylate monomer(s); and
    b) a urethane (meth)acrylate polymer comprising a reaction product of at least: a diol lacking pendent cyclic moieties, a polyisocyanate, and a reactive compound comprising pendent cyclic moieties;
    wherein the reaction product comprises at least 1 weight percent polymerized units of a multifunctional compound comprising pendent cyclic moieties.

2. The orthodontic article of claim 1, wherein the pendent cyclic moieties are derived from an isocyanate reactive compound or a hydroxyl reactive compound comprising pendent cyclic moieties.

3. The orthodontic article of claim 1, wherein the urethane (meth)acrylate polymer comprises a reaction product of:
    i) an isocyanate reactive or a hydroxyl reactive compound comprising a pendent cyclic moiety,
    ii) a polyol lacking pendent cyclic moieties,
    iii) a diisocyanate lacking pendent cyclic moieties, and
    iv) a hydroxy functional (meth)acrylate or an isocyanate functional (meth)acrylate.

4. The orthodontic article of claim 3, wherein the urethane (meth)acrylate polymer further comprises a reaction product of a diol (meth)acrylate.

5. The orthodontic article of claim 3, wherein the diol lacking pendent cyclic moieties is at least one of: a polyester diol, a polycarbonate diol, or a polyether diol.

6. The orthodontic article of claim 1, wherein at least one of the (meth)acrylate monomer(s) comprises at least one pendent cyclic moiety.

7. The orthodontic article of claim 1, wherein the urethane (meth)acrylate polymer and the (meth)acrylate monomer(s) are present at a weight ratio ranging from 2:1 to 1:2.

8. The orthodontic article of claim 1, wherein the (meth)acrylate monomer(s) comprise at least one monofunctional (meth)acrylate monomer.

9. The orthodontic article of claim 6, wherein the (meth)acrylate monomer has a log P value of greater than 1, 1.5, 2, 2.5, or 3.

10. The orthodontic article of claim 6, wherein the (meth) acrylate monomer has a glass transition temperature of at least 30° C., 40° C., 50° C., 60° C., 70° C., 80° C., or 90° C.

11. The orthodontic article of claim 1, wherein the urethane (meth)acrylate polymer comprises the formula:

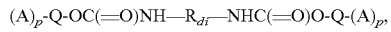

wherein A has the formula —OC(═O)C($R_1$)═$CH_2$, wherein $R_1$ is H or an alkyl of 1 to 4 carbon atoms, p is 1 or 2, Q is a polyvalent organic linking group, and $R_{di}$ is the residue of a diisocyanate.

12. The orthodontic article of claim 1, wherein the polymerizable composition is polymerized and exhibits;
   an elongation at break of 15% or greater and a tensile strength at yield of at least 10 megapascals (MPa) as determined according to ASTM D638-14 after conditioning in phosphate-buffered saline with a pH of 7.4 for 24 hours at 37° C., or
   a loss of relaxation modulus of less than 70%, 65%, 60%, 55%, or 50%, as determined according to Dynamic Mechanical Analysis after conditioning in deionized water for 48 hours at 22-25° C.

13. The orthodontic article of claim 1, wherein the polymerizable composition is polymerized and exhibits a loss of relaxation modulus of less than 70%, 65%, 60%, 55%, or 50%, as determined according to Dynamic Mechanical Analysis after conditioning in deionized water for 48 hours at 22-25° C.

14. The orthodontic article of claim 1, wherein the polymerizable composition comprises a photoinitiator.

15. The orthodontic article of claim 1, wherein the orthodontic article is an orthodontic alignment tray.

16. A polymerizable composition comprising:
   a) 30-70 parts by weight of (meth)acrylate monomer(s); and
   b) a urethane (meth)acrylate polymer comprising a reaction product of at least: a diol lacking pendent cyclic moieties, a polyisocyanate, and a reactive compound comprising pendent cyclic moieties;
   wherein a reaction product of the polymerizable composition comprises at least 1 weight percent polymerized units of a multifunctional compound comprising the pendent cyclic moieties.

17. A method of making an article comprising:
   a) providing a photopolymerizable composition according to claim 16;
   b) selectively curing the photopolymerizable composition to form the article; and
   c) repeating steps a) and b) to form multiple layers and create the article comprising a three-dimensional structure.

18. A method comprising:
   a) receiving, by a manufacturing device having one or more processors, a digital object comprising data specifying a plurality of layers of an article; and
   b) generating, with the manufacturing device by an additive manufacturing process, the article based on the digital object, the article comprising a reaction product of a photopolymerizable composition according to claim 16.

19. The orthodontic article of claim 11, wherein Q comprises a straight or branched chain or cycle-containing aliphatic connecting group.

* * * * *